(12) United States Patent
Gehr (10) Patent No.: US 10,723,954 B2
(45) Date of Patent: *Jul. 28, 2020

(54) METHOD AND DEVICE FOR RECOVERING CARBON FIBRES FROM CARBON-FIBRE CONTAINING PLASTICS

(71) Applicant: ELG CARBON FIBRE INTERNATIONAL GMBH, Duisburg (DE)

(72) Inventor: Marco Gehr, Lidlar (DE)

(73) Assignee: ELG Carbon Fibre International GmbH, Duisburg (DE)

( * ) Notice: Subject to any disclaimer, the term of this patent is extended or adjusted under 35 U.S.C. 154(b) by 1039 days.

This patent is subject to a terminal disclaimer.

(21) Appl. No.: 14/780,843

(22) PCT Filed: Mar. 25, 2014

(86) PCT No.: PCT/EP2014/055906
§ 371 (c)(1),
(2) Date: Sep. 28, 2015

(87) PCT Pub. No.: WO2014/154656
PCT Pub. Date: Oct. 2, 2014

(65) Prior Publication Data
US 2016/0060535 A1    Mar. 3, 2016

(30) Foreign Application Priority Data

Mar. 28, 2013 (EP) .................................... 13001622
Apr. 16, 2013 (EP) .................................... 13001992

(51) Int. Cl.
*C10B 57/02* (2006.01)
*B29B 17/04* (2006.01)
*C10B 53/07* (2006.01)
*D01F 9/14* (2006.01)
*B29B 17/02* (2006.01)
(Continued)

(52) U.S. Cl.
CPC .............. *C10B 57/02* (2013.01); *B29B 17/02* (2013.01); *B29B 17/04* (2013.01); *C10B 47/30* (2013.01); *C10B 53/07* (2013.01); *D01F 9/14* (2013.01); *B29B 2017/0496* (2013.01); *B29K 2105/06* (2013.01); *B29K 2105/12* (2013.01); *B29K 2307/04* (2013.01); *B29K 2707/04* (2013.01);
(Continued)

(58) Field of Classification Search
CPC ............ C10B 57/02; C10B 53/07; D01F 9/14
See application file for complete search history.

(56) References Cited

U.S. PATENT DOCUMENTS

| | | | |
|---|---|---|---|
| 2010/0189629 A1* | 7/2010 | Price | B29B 17/02 |
| | | | 423/461 |
| 2016/0039118 A1* | 2/2016 | Gehr | F27B 7/20 |
| | | | 428/367 |

FOREIGN PATENT DOCUMENTS

WO    WO-03089212 A1 * 10/2003 ............. B29B 17/02

* cited by examiner

*Primary Examiner* — Bobby Ramdhanie
*Assistant Examiner* — Denise R. Anderson
(74) *Attorney, Agent, or Firm* — Edward E. Sowers; Brannon Sowers & Cracraft PC (57) ABSTRACT

The present invention relates to a process and an apparatus for recovering (recycling) carbon fibers from carbon fiber-containing plastics, in particular from carbon fiber-reinforced plastics (CFPs), preferably from carbon fiber-containing and/or carbon fiber-reinforced composites (Continued)

(composite materials), and also to the recycled carbon fibers obtainable by the process according to the invention and the use thereof.

20 Claims, 1 Drawing Sheet

(51) Int. Cl.
*C10B 47/30* (2006.01)
*B29K 707/04* (2006.01)
*B29K 105/06* (2006.01)
*B29K 105/12* (2006.01)
*B29K 307/04* (2006.01)

(52) U.S. Cl.
CPC ........... *Y02P 20/143* (2015.11); *Y02W 30/622* (2015.05); *Y02W 30/625* (2015.05)

METHOD AND DEVICE FOR RECOVERING CARBON FIBRES FROM CARBON-FIBRE CONTAINING PLASTICS

CROSS-REFERENCES TO RELATED APPLICATIONS

This application is a National Stage filing of International Application PCT/EP 2014/055906, filed Mar. 25, 2014, entitled "METHOD AND DEVICE FOR RECOVERING CARBON FIBRES FROM CARBON-FIBRE-CONTAINING PLASTICS" claiming priority to EP 13 001 622.3 filed Mar. 28, 2013 and EP 13 001 992.0 filed Apr. 16, 2013. The subject application claims priority to PCT/EP 2014/055906; to EP 13 001 622.3 and to EP 13 001 992.0 and incorporates all by reference herein, in their entirety.

BACKGROUND OF THE INVENTION

The present invention relates to the technical field of recovery (recycling) of carbon fibers from carbon fiber-containing plastics, in particular from carbon fiber-reinforced plastics (CFPs), preferably from carbon fiber-containing or carbon fiber-reinforced composites (composite materials).

In particular, the present invention relates to a process for recovering (recycling) carbon fibers from carbon fiber-containing plastics, in particular from carbon fiber-reinforced plastics (CFPs), preferably from carbon fiber-containing or carbon fiber-reinforced composites (composite materials), and also the recycled carbon fibers obtainable by this process and their use.

The present invention additionally relates to plastics, building materials or cement-containing systems which comprise recycled carbon fibers obtainable by the process of the invention, or which have been produced using recycled carbon fibers obtainable by the process of the invention.

Finally, the present invention relates to shaped bodies (e.g. components), molds and sheet-like materials (e.g. nonwovens), in particular in the form of composite materials or compounds which comprise recycled carbon fibers obtainable by the process of the invention or which have been produced using recycled carbon fibers obtainable by the process of the invention.

In general, carbon fiber-reinforced plastics (also known synonymously as CFPs) in which a multiplicity of carbon fibers are embedded, preferably in a plurality of layers, as reinforcement in a matrix such as plastic can be referred to as fiber-plastic composites. As polymer matrix, it is possible to use both thermosets such as epoxy resins, acrylates and polyurethanes and also thermoplastics such as acrylonitrile-butadiene-styrene (ABS), polyamide (PA), polylactate (PLA), polymethyl methacrylate (PMMA), polycarbonate (PC), polyethylene terephthalate (PET), polyethylene (PE), polypropylene (PP), polystyrene (PS), polyether ether ketone (PEEK) and polyvinyl chloride (PVC). However, it is also possible to embed carbon fibers in a matrix composed of ceramic (also referred to synonymously as ceramic fiber composites) in order to obtain thermally very stable components such a brake disks.

Carbon fiber-reinforced plastics (CFPs) have a high strength and stiffness combined with a low weight and are preferably used in fields where high weight-specific strengths and stiffnesses are required. For example, CFPs are used in the aerospace industry, in the wind power industry, in vehicle construction or for sports equipment such as bicycle frames, speed skates, tennis rackets, sporting arrows and fishing rods. In building and construction, carbon fiber-reinforced plastics (CFPs) can be adhesively bonded in the form of lamellae on the surface of the component in order to reinforce constructions.

The strength and stiffness of materials or components produced from carbon fiber-reinforced plastics (CFPs) is generally, as in the case of other fiber-matrix composites, significantly higher in the fiber direction than transverse to the fiber direction. Thus, for example, the strength transverse to the carbon fibers can be lower than the strength of the matrix material used. In order to ensure a uniform strength and stiffness of the materials or components composed of CFPs in all directions in space, individual fiber layers are laid in various directions. For example, in the case of high-performance construction components, the fiber directions can be determined by means of computer calculations such as the classical laminate theory in order to achieve the prescribed strength and stiffness.

The primary carbon fibers (also referred to synonymously as virgin fibers) used in the production of CFPs are predominantly produced industrially from carbon-containing starting materials, in particular polyacrylonitrile (PAN), by stabilization reactions in air, subsequent pyrolysis in an inert atmosphere and subsequent graphitization. The stiffness and strength of the primary carbon fibers can be controlled in a targeted manner during the production process by means of the pretensioning and also the temperatures in the carbonization and graphitization, so that various fiber types are commercially available. Owing to their inexpensive production, HT fibers (high-tensile fibers) and IM fibers (intermediate modulus fibers) are predominantly used as primary carbon fibers. In order to improve the adhesion of the primary carbon fibers after graphitization, an oxidation of the surface of the primary carbon fibers can be carried out by means of an electrochemical treatment. In general, the primary carbon fibers are subsequently provided with a size such as an epoxy resin and collected together to form rovings. These rovings are wound up onto conventional textile spindles in a last step.

Depending on the length of the primary carbon fibers used, various processes can be used for producing carbon fiber-reinforced plastics (CFPs). CFP parts having long primary carbon fibers can generally be produced by means of resin injection processes (also referred to as resin transfer molding (RTM)). In a first step of the resin injection process, preforms which consist of one layer or a plurality of layers of woven primary carbon fibers in order to ensure constant strength and stiffness in all directions in space are produced. These preforms are, in a second step, admixed in a closed casting mold with a liquefied matrix composed of plastic and optionally hardener. After curing of the matrix and removal of excess edge material, the corresponding CFP components are obtained.

The production of carbon fiber-reinforced plastics (CFPs) having short primary carbon fibers, in particular chopped primary carbon fibers, is generally carried out by means of injection molding. For this purpose, the chopped primary carbon fibers are mixed batchwise with a liquefied matrix composed of plastic(s), extruded and subsequently processed by means of injection molding to give CFP components.

However, the use of carbon fiber-reinforced plastics (CFPs) leads, in comparison with the use of similar components composed of light metals such as aluminum, magnesium and titanium, to considerably higher costs of the final product. This is related, in particular, to the complicated and costly production of primary carbon fibers from carbon-containing starting materials, in particular polyacrylonitrile (PAN). In addition, the worldwide consumption of primary carbon fibers for producing CFP components is increasing greatly, so that no significant reduction of the costs in the use of carbon fiber-reinforced plastics can be expected because of the high worldwide demand for primary carbon fibers.

Despite the high demand for primary carbon fibers, large quantities of primary carbon fibers which are unprocessed but have been preimpregnated with a plastic (referred to as prepregs or preimpregnated fibers), in which the plastic has been cured or which have exceeded the storage date, are disposed of as CFP-containing scrap.

In addition, large amounts of CFP-containing plastic scrap, which has to be disposed of, are obtained in the production of aircraft parts and parts for wind turbines and also as a result of modeling molds, production scrap, prototypes, incorrect batches and "end-of-life" components to be disposed of.

However, the disposal of CFP-containing plastics scrap in landfills is uneconomical because of the valuable carbon fibers present therein. Furthermore, it can generally be expected that the CFP-containing plastics scrap remains unchanged over a long period of time because of its chemical inertness and cannot be degraded in landfills. In addition, unlimited disposal of CFP-containing scrap is not readily possible or even prohibited because of legal requirements in many European countries.

There is therefore a great demand for inexpensive and efficient processes for recovering or recycling carbon fibers from CFP-containing scrap, in particular in the light of the worldwide demand for carbon fibers for the production of CFP components.

In the prior art, processes for recovering carbon fibers from CFP-containing scrap are known. However, these processes ensure the use of an inert atmosphere or the use of reduced pressure during the removal of the polymer matrix, and so sealed and complex devices and also complicated processes are necessary.

Due to the complex processes and devices, the costs for the recovery (recycling) of carbon fibers from CFP-containing scrap are high, with the processes described previously.

Furthermore, the CFP-containing scrap has to be pretreated in a complicated fashion, in particular by means of mechanical and/or chemical processes, before recovery (recycling).

For this reason, the use of recycled carbon fibers in CFP components has hitherto been possible to only a limited extent because of the mechanical pre-treatment, in particular the comminution. In addition, the recycled carbon fibers have a high proportion of pyrolysis and coking residues, which can have a negative effect on the incorporation into a polymer matrix.

Processes of this type in the prior art are described, for example, in DE 10 2008 002 846 B4, EP 0 636 428 A1 and DE 100 26 761 C1.

Processes for recycling carbon fibers from CFP-containing scrap on the laboratory scale are also known in the prior art. However, these processes are often complex and unsuitable for the recycling of carbon fibers on the industrial scale.

SUMMARY

It is therefore an object of the present invention to provide a process for recovering (recycling) carbon fibers from carbon fiber-containing plastics, in particular from carbon fiber-reinforced plastics (CFPs), preferably from carbon fiber-containing and/or carbon fiber-reinforced composites (composite materials), with the abovementioned disadvantages associated with the prior art being at least largely avoided or else at least decreased.

In particular, it is an object of the present invention to provide a process for recovering (recycling) carbon fibers from carbon fiber-containing plastics, with the process being able to be carried out inexpensively and on an industrial scale. Furthermore, the process should give recycled carbon fibers which are at least essentially free of pyrolysis or carbonization residues and display good incorporability into plastics.

The applicant has now surprisingly found that the abovementioned objects can be achieved in an efficient way in that the method for recovering (recycling) carbon fibers from carbon fiber-containing plastics is carried out in such a way that the polymer matrix of such carbon fiber-containing plastics is subjected to pyrolysis in the presence of oxygen in a pyrolysis apparatus having at least one first pyrolysis zone and a subsequent second pyrolysis zone, with the oxygen content of the second pyrolysis zone being increased compared to the oxygen content of the first pyrolysis zone and/or the temperature of the second pyrolysis zone being increased compared to the temperature of the first pyrolysis zone.

The process of the invention results firstly in a selective removal of the polymer matrix, so that recycled carbon fibers which have at least essentially no pyrolysis of carbonization residues are obtained. Secondly, the process conditions according to the invention lead to partial oxidation of the surface of the recycled carbon fibers, i.e. to a rougher surface which shows an affinity for bonding, in particular a hydrophilic surface, and to an increase in oxygen-containing groups on the surface of the resulting recycled carbon fibers, e.g. hydroxy, aldehyde, carboxyl groups, etc. The partial oxidation of the surface of the recycled carbon fibers resulting from the process of the invention leads, owing to the rougher and functionalized, in particular more hydrophilic, surface of the recycled carbon fibers, to increased wettability and thus also to improved incorporability into plastics compared to primary carbon fibers or conventionally recycled carbon fibers.

To solve the abovementioned problem, the present invention thus proposes a process for recovering (recycling) carbon fibers from carbon fiber-containing plastics, in particular from carbon fiber-reinforced plastics (CFPs), preferably from carbon fiber-containing and/or carbon fiber-reinforced composites (composite materials) as described herein. Further, advantageous properties of the process of the invention are subject matter of the relevant dependent process claims.

Furthermore, the present invention provides the recycled carbon fibers obtainable by the process of the invention as described herein. Further, advantageous properties of the recycled carbon fibers according to the invention are subject matter of the relevant dependent claims directed to the recycled carbon fibers.

In addition, the present invention further provides the use according to the invention of the recycled carbon fibers, as is described and defined herein.

The present invention also provides plastics, building materials or cement-containing systems as described herein which comprise recycled carbon fibers obtainable by the process of the invention or which have been produced using recycled carbon fibers obtainable by the process of the invention.

Finally, the present invention provides shaped bodies (e.g. components), molds and sheet-like materials (e.g. nonwovens), in particular in the form of composite materials or compounds, as described herein which comprise recycled carbon fibers obtainable by the process of the invention or which have been produced using recycled carbon fibers obtainable by the process of the invention.

It goes without saying that particular configurations and embodiments which are described only in the context of one aspect of the invention also apply analogously to the other aspects of the invention without this being expressly indicated.

In addition, a person skilled in the art can, for a particular application or an individual case, deviate from the numbers, values or ranges indicated below without going outside the scope of the present invention.

DETAILED DESCRIPTION OF THE INVENTION

The present invention thus provides, according to a first aspect of the present invention, a process for recovering (recycling) carbon fibers from carbon fiber-containing plastics, in particular from carbon fiber-reinforced plastics (CFPs), preferably from carbon fiber-containing and/or carbon-reinforced composites (composite materials),
in which an object based on a carbon fiber-containing plastic which comprises carbon fibers in a polymer matrix is subjected to a multistage pyrolysis in the presence of oxygen, with the polymer of the polymer matrix being decomposed during the pyrolysis to give the carbon fibers, where the pyrolysis is carried out in a pyrolysis apparatus P, and the pyrolysis apparatus P comprises at least the following treatment zones in the order specified below and the object to be recycled and/or to be treated goes through the following treatment zones in this order:
(A) a heating-up zone A in which the object to be treated and/or to be recycled is heated to a defined temperature T(A),
(B1) subsequently a first pyrolysis zone B1 in which a pyrolysis of the polymer of the polymer matrix of the object to be treated occurs and/or is carried out at a defined temperature T(B1) and a defined oxygen content G(B1),
(B2) subsequently a second pyrolysis zone B2 in which a final pyrolysis of the polymer of the polymer matrix of the object to be treated still present after the pyrolysis zone B1 is carried out at a defined temperature T(B2) and a defined oxygen content G(B2) to at least essentially complete removal,
(C) subsequently a cooling zone C for cooling the recycled carbon fibers RF obtained from the second pyrolysis zone B2, where the oxygen content G(B2) in the second pyrolysis zone B2 is increased compared to the oxygen content G(B1) in the first pyrolysis zone B1 and/or the temperature T(B2) in the second pyrolysis zone B2 is increased compared to the temperature T(B1) in the first pyrolysis zone B1, preferably where the oxygen content G(B2) in the second pyrolysis zone B2 is increased compared to the oxygen content G(B1) in the first pyrolysis zone B1 and where the temperature T(B2) in the second pyrolysis zone B2 is increased compared to the temperature T(B1) in the first pyrolysis zone B1.

The temperatures indicated, in particular the temperatures T(B1) and T(B2) indicated, and the specific temperature values and temperature value ranges indicated below in this context relate, in particular, to the temperatures which are reached in the object to be treated or to be recycled.

One peculiarity of the process of the invention for recovering (recycling) carbon fibers from carbon-containing plastics is, in particular, that, as a result of the process conditions according to the invention, in particular the increase in the oxygen content in the second pyrolysis zone and/or the increase in the temperature in the second pyrolysis zone, recycled carbon fibers which surprisingly have at least essentially no pyrolysis residues and in addition, in particular owing to the partial oxidation of the surface of the carbon fibers, have better wettability compared to primary carbon fibers and to conventionally recycled carbon fibers are obtained.

Thus, the process according to the invention allows selective removal of the polymer of the polymer matrix without destroying the recycled carbon fibers and consequently no significant deterioration in the mechanical properties, in particular the tensile strength and the modulus of elasticity, occurs, so that the materials properties of the recycled carbon fibers correspond at least essentially to those of primary carbon fibers.

Furthermore, the implementation of the process of the invention results in the surface of the recycled carbon fibers being slightly oxidized, i.e. the surface is rougher and the number of oxygen-containing functional groups on the surface of the carbon fibers, e.g. phenol, carboxyl, carbonyl, aldehyde, keto, hydroxy and/or oxo groups, is significantly greater than in the case of primary carbon fibers or conventionally recycled carbon fibers.

The roughening and greater hydrophilicity of the recycled carbon fibers which results from the oxidized surface leads to improved wettability and thus to better incorporability of the recycled carbon fibers into plastics, building materials or cement-containing systems.

In a preferred embodiment of the present invention, the oxygen content G(B2) in the second pyrolysis zone B2 is increased by at least 3% by volume, in particular at least 5% by volume, preferably at least 7.5% by volume, particularly preferably by at least 10% by volume, compared to the oxygen content G(B1) in the first pyrolysis zone B1. In order to avoid oxidation of the carbon fibers in the first pyrolysis zone B1, a smaller amount of oxygen than in the second pyrolysis zone B2 in which the removal of pyrolysis residues from the surface of the recycled carbon fibers occurs is used. The decomposition of the polymer matrix of the plastic thus takes place, at least essentially in the first pyrolysis section B1, at lower oxygen contents than the removal of pyrolysis residues in the second pyrolysis zone B2. The presence of only small amounts of oxygen in the first pyrolysis zone B1 is achieved, in particular, by the atmosphere in the first pyrolysis zone B1 being essentially saturated with vapor which consists, in particular, of gaseous decomposition products occurring in the pyrolysis of the polymer matrix of the plastics and which has only a small proportion of oxygen.

In this context, the oxygen content G(B2) in the second pyrolysis zone B2 is, in particular, increased by from 3% by volume to 25% by volume, in particular by from 5% by volume to 20% by volume, preferably by from 7.5% by volume to 17.5% by volume, particularly preferably by from 10% by volume to 15% by volume, compared to the oxygen content G(B1) in the first pyrolysis zone B1. As indicated above, a higher oxygen content in the second pyrolysis zone B2 than in the first pyrolysis zone B1 is set in order to at least essentially completely remove the pyrolysis residues on the surface of the recycled carbon fibers.

Particularly good results according to the present invention are obtained when the oxygen content G(B1) in the first pyrolysis zone B1 is set in the range from 0.1% by volume to 12% by volume, in particular in the range from 0.5% by volume to 10% by volume, preferably in the range from 0.75% by volume to 6% by volume, particularly preferably in the range from 1% by volume to 4% by volume, and the oxygen content G(B2) in the second pyrolysis zone B2 is set to values in the range from 2% by volume to 30% by volume, in particular in the range from 3% by volume to 20% by volume, preferably in the range from 5% by volume to 17% by volume, particularly preferably in the range from 6% by volume to 14% by volume, but, in particular, with the proviso that the oxygen content G(B2) in the second pyrolysis zone B2 is increased by at least 3% by volume, in particular by at least 5% by volume, preferably by at least 7.5% by volume, particularly preferably by at least 10% by volume, compared to the oxygen content G(B1) in the first pyrolysis zone B1 and/or the oxygen content G(B2) in the second pyrolysis zone B2 is increased by from 3% by volume to 25% by volume, in particular by from 5% by volume to 20% by volume, preferably by from 7.5% by volume to 17.5% by volume, particularly preferably by from 10% by volume to 15% by volume, compared to the oxygen content G(B1) in the first pyrolysis zone B1.

For the purposes of the present invention, it is possible, in particular, for the oxygen content in the first and second pyrolysis zones B1 and B2 to be controlled and/or regulated in such a way that the oxygen content G(B1) in the first pyrolysis zone B1 is set to a substoichiometric value relative to the polymer matrix to be decomposed and the oxygen content G(B2) in the second pyrolysis zone B2 is set to a superstoichiometric value relative to the carbon matrix to be decomposed. Preference is thus given according to the invention for the decomposition of the polymer matrix of the plastic to be carried out in the presence of smaller amounts of oxygen in the first pyrolysis zone B1 and the removal of the pyrolysis residues being carried out in the presence of large amounts of oxygen in the second pyrolysis zone B2. In particular, the oxygen content in the first pyrolysis zone B1 is set so that it is present in an amount which is smaller than the amount of oxygen required for the combustion of the gaseous decomposition products of the polymer matrix; the small amount of oxygen in the first pyrolysis zone B2 is necessary in order to avoid oxidation of the carbon fibers and thus partial or complete destruction of the carbon fibers, which would result in significantly worsened mechanical properties. However, a higher oxygen content in the atmosphere relative to the polymer matrix of the plastic to be decomposed is necessary for the complete combustion of the pyrolysis residues on the surface of the recycled carbon fibers in the second pyrolysis zone B2.

According to the invention, preference can be given to controlling and/or regulating the oxygen content during the pyrolysis, preferably during the entire process, in particular the oxygen content G(B1) in the first pyrolysis zone B1 and the oxygen content G(B2) in the second pyrolysis zone B2, preferably by taking off decomposition products originating from the decomposition of the polymer matrix, in particular gaseous decomposition products, and/or by introduction of oxygen, preferably in the form of air. According to the invention, the oxygen content in the first pyrolysis zone B1 and in the second pyrolysis zone B2 is controlled by taking off the gaseous decomposition products of the polymer matrix of the plastic in such a way that the oxygen content in the first pyrolysis zone B1 is sufficiently high to make the decomposition and partial combustion of the polymer matrix of the plastic possible but on the other hand is sufficiently low to restrict destruction of the carbon fibers by oxidation to a minimum level or avoid it entirely. Furthermore, the oxygen content in the second pyrolysis zone B2 is, according to the invention, set so that combustion of the pyrolysis residues on the surface of the recycled carbon fibers is ensured and partial oxidation of the surface of the recycled carbon fibers occurs, but without destroying the recycled carbon fibers. The setting of the oxygen content in the first pyrolysis zone B1 and the second pyrolysis zone B2 is, according to the invention, effected by taking off the gaseous decomposition products of the polymer matrix of the plastic. Taking off the combustion gases results in a suction effect as a result of which air flows through the preferably open pyrolysis apparatus into the respective zone. The control and/or regulation of the oxygen content in the respective pyrolysis zone is thus very easy to carry out from a process engineering point of view and does not require use of costly gases such as oxygen.

In this context, the oxygen content during the pyrolysis, preferably during the entire process, in particular the oxygen content G(B1) in the first pyrolysis zone B1 and the oxygen content G(B2) in the second pyrolysis zone B2, can be measured by means of oxygen measurement devices, in particular oxygen-sensitive sensors and/or pressure sensors. Here, in particular, the oxygen content can be controlled and/or regulated by means of the oxygen measurement devices by taking off decomposition products originating from the decomposition of the polymer matrix, preferably by means of venting devices, and/or by introduction of oxygen. For the purposes of the present invention, the oxygen content in the first pyrolysis zone B1 and in the second pyrolysis zone B2 can be measured by means of sensors and/or pressure sensors such as pitot tubes. The oxygen content determined serves, in the context of the present invention, to control venting devices as a function of the oxygen content determined and the intended value of the oxygen content in the respective pyrolysis zone. Thus, the oxygen content can be increased by opening venting devices and taking off gaseous combustion gases in the first and second pyrolysis zones, since taking off the gaseous decomposition products results in a suction effect and flow of air from the surroundings into the respective pyrolysis zone in the open pyrolysis apparatus P used according to the invention. Increasing the oxygen content in the atmosphere of the respective pyrolysis zone promotes both the combustion of the polymer matrix and also combustion of the pyrolysis residues at the surface of the recycled carbon fibers. However, increased oxidation of the surface of the recycled carbon fibers also occurs.

In a preferred embodiment of the present invention, the oxygen content during the pyrolysis, preferably during the entire process, in particular the oxygen content G(B1) in the first pyrolysis zone B1 and the oxygen content G(B2) in the second pyrolysis zone B2, is controlled and/or regulated in such a way that only the polymer matrix is at least essentially selectively pyrolyzed in the first pyrolysis zone B1 and only the polymer matrix still remaining after the first pyrolysis zone B1 and pyrolysis residues are removed at least essentially selectively and the surface of the carbon fibers which have been recycled in this way is at least partially oxidized in the second pyrolysis zone B2. Control of the oxygen content in the first and second pyrolysis zones B1 and B2 enables the polymer matrix of the plastic to be pyrolyzed selectively, i.e. thermally decomposed selectively in the presence of a certain oxygen content, but without excessive oxidation on the surface of the recycled carbon fibers taking place. The reduced amount of oxygen in the first pyrolysis zone B1 does not influence the thermal decomposition of the polymer matrix of the plastic, but reduced combustion of the gaseous decomposition products of the polymer of the polymer matrix and also only low oxidation of the carbon fibers takes place. In the second pyrolysis zone B2, the oxygen content is set in such a way that remaining polymer matrix of the plastic and pyrolysis residues formed on the surface of the recycled carbon fibers in the first pyrolysis zone B1 are removed. Owing to the higher amount of oxygen in the second pyrolysis zone B2, at least partial oxidation of the surface of the recycled carbon fibers also takes place there, leading at the same time to improved wettability as a result of the more hydrophilic and rougher surface.

As described above, the temperature T(B2) in the second pyrolysis zone B2 can, according to the invention and in particular, be increased compared to the temperature T(B1) in the first pyrolysis zone B1.

According to the invention, the temperature T(B2) in the second pyrolysis zone B2 can, in this context, be increased by at least 25° C., in particular by at least 50° C., preferably by at least 75° C., particularly preferably by at least 100° C., even more preferably by at least 125° C., very particularly preferably by at least 150° C., compared to the temperature T(B1) in the first pyrolysis zone B1. To ensure essentially complete removal of the pyrolysis residues on the surface of the recycled carbon fibers in the second pyrolysis zone B2, a higher temperature T(B2) than in the first pyrolysis zone B1 can be selected in the second pyrolysis zone B2, since at least essentially complete removal of the pyrolysis residues on the surface of the recycled carbon fibers is ensured at elevated temperatures, in particular in combination with higher oxygen contents. However, the temperature should not exceed a particular maximum value since otherwise the recycled carbon fibers oxidize excessively and as a result the at least partial destruction of the recycled carbon fibers occurring could significantly reduce the mechanical stability of the fibers.

In particular, the temperature T(B2) in the second pyrolysis zone B2 can be increased by from 25° C. to 300° C., in particular by from 50° C. to 250° C., preferably by from 75° C. to 200° C., particularly preferably by from 100° C. to 175° C., compared to the temperature T(B1) in the first pyrolysis zone B1.

According to the invention, preference is given to setting the temperature T(B1) in the first pyrolysis zone B1 in the range from 375° C. to 475° C., in particular in the range from 390° C. to 465° C., preferably in the range from 415° C. to 455° C., particularly preferably in the range from 430° C. to 445° C., and setting the temperature T(B2) in the second pyrolysis zone B2 in the range from 450° C. to 750° C., in particular in the range from 480° C. to 690° C., preferably in the range from 510° C. to 675° C., particularly preferably in the range from 515° C. to 650° C., but, in particular, with the proviso that the temperature T(B2) in the second pyrolysis zone B2 is increased by at least 25° C., in particular by at least 50° C., preferably by at least 75° C., particularly preferably by at least 100° C., even more preferably by at least 125° C., very particularly preferably by at least 150° C., compared to the temperature T(B1) in the first pyrolysis zone B1 and/or that the temperature T(B2) in the second pyrolysis zone B2 is increased by from 25° C. to 300° C., in particular by from 50° C. to 250° C., preferably by from 75° C. to 200° C., particularly preferably by from 100° C. to 175° C., compared to the temperature T(B1) in the first pyrolysis zone B1. The first pyrolysis zone B1 serves to decompose the polymer matrix of the plastic selectively and at least partially burn the resulting gaseous decomposition products by means of oxygen present in the atmosphere of the pyrolysis zone B1; owing to the small amount of oxygen in the atmosphere of the first pyrolysis zone B1, slow decomposition of the polymer matrix of the plastic occurs, so that pyrolysis residues form on the surface of the carbon fibers. These pyrolysis residues have to be removed in a second pyrolysis zone B2 at higher temperatures than in the first pyrolysis zone B1, with excessive oxidation of the recycled carbon fibers being avoided, as indicated above, by setting of a defined temperature and of a defined oxygen content.

In this context, the temperature during the pyrolysis, preferably during the entire process, in particular the temperature T(B1) in the first pyrolysis zone B1 and the temperature T(B2) in the second pyrolysis zone B2, can be controlled and/or regulated, preferably by means of temperature measurement devices, in particular temperature-sensitive sensors. The control of the temperature in the first and second pyrolysis zones B1 and B2 by means of temperature-sensitive sensors is advisable in order to ensure selective pyrolysis of the polymer matrix of the plastic in the first pyrolysis zone B1 and also ensure complete removal of the pyrolysis residues on the surface of the recycled carbon fibers in the second pyrolysis zone B2. In this context, a defined control of the temperatures T(B1) and T(B2) in the first and second pyrolysis zones B1 and B2 should be ensured in order to avoid excessive oxidation and/or decomposition of the carbon fibers, which would result in a significantly reduced mechanical stability of the recycled carbon fibers.

According to the invention, preference can be given to the temperature during the pyrolysis, preferably during the entire process, in particular the temperature T(B1) in the first pyrolysis zone B1 and the temperature T(B2) in the second pyrolysis zone B2, being controlled and/or regulated in such a way that only the polymer matrix is at least essentially selectively pyrolyzed in the first pyrolysis zone B1 and only the polymer matrix still remaining after the first pyrolysis zone B1 and pyrolysis residues are at least essentially selectively removed and the surface of the carbon fibers which have been recycled in this way is at least partially oxidized in the second pyrolysis zone B2.

In an embodiment which is preferred according to the invention, the oxygen content G(B2) in the second pyrolysis zone B2 is increased compared to the oxygen content G(B1) in the first pyrolysis zone B1 and the temperature T(B2) in the second pyrolysis zone B2 is increased compared to the temperature T(B1) in the first pyrolysis zone B1. In this context, preference is given according to the present invention to the oxygen content G(B1) in the first pyrolysis zone B1 being set in the range from 0.1% by volume to 12% by volume, in particular in the range from 0.5% by volume to 10% by volume, preferably in the range from 0.75% by volume to 6% by volume, particularly preferably in the range from 1% by volume to 4% by volume, and the oxygen content G(B2) in the second pyrolysis zone B2 being set in the range from 2% by volume to 30% by volume, in particular in the range from 3% by volume to 20% by volume, preferably in the range from 5% by volume to 17% by volume, particularly preferably in the range from 6% by volume to 14% by volume, but with the proviso that the oxygen content G(B2) in the second pyrolysis zone B2 is increased by at least 3% by volume, in particular by at least 5% by volume, preferably by at least 7.5% by volume, particularly preferably by at least 10% by volume, compared to the oxygen content G(B1) in the first pyrolysis zone B1 and/or that the oxygen content G(B2) in the second pyrolysis zone B2 is increased by from 3% by volume to 25% by volume, in particular by from 5% by volume to 20% by volume, preferably by from 7.5% by volume to 17.5% by volume, particularly preferably by from 10% by volume to 15% by volume, compared to the oxygen content G(B1) in the first pyrolysis zone B1. Furthermore, preference is given according to the present invention in this context to the temperature T(B1) in the first pyrolysis zone B1 being set in the range from 375° C. to 475° C., in particular in the range from 390° C. to 465° C., preferably in the range from 415° C. to 455° C., particularly preferably in the range from 430° C. to 445° C., and the temperature T(B2) in the second pyrolysis zone B2 being set in the range from 450° C. to 750° C., in particular in the range from 480° C. to 690° C., preferably in the range from 510° C. to 675° C., particularly preferably in the range from 515° C. to 650° C., but with the proviso that the temperature T(B2) in the second pyrolysis zone B2 is increased by at least 25° C., in particular by at least 50° C., preferably by at least 75° C., particularly preferably by at least 100° C., even more preferably by at least 125° C., very particularly preferably by at least 150° C., compared to the temperature T(B1) in the first pyrolysis zone B1 and/or that the temperature T(B2) in the second pyrolysis zone B2 is increased by from 25° C. to 300° C., in particular by from 50° C. to 250° C., preferably by from 75° C. to 200° C., particularly preferably by from 100° C. to 175° C., compared to the temperature T(B1) in the first pyrolysis zone B1.

For the purposes of the present invention, it is possible, in particular, for the oxygen content G(B2) in the second pyrolysis zone B2 to be increased compared to the oxygen content G(B1) in the first pyrolysis zone B1 and the temperature T(B2) in the second pyrolysis zone B2 to be increased compared to the temperature T(B1) in the first pyrolysis zone B1. In this context, it is also possible for the oxygen content G(B1) in the first pyrolysis zone B1 to be set in the range from 0.75% by volume to 6% by volume and the oxygen content G(B2) in the second pyrolysis zone B2 to be set in the range from 6% by volume to 14% by volume, but with the proviso that the oxygen content G(B2) in the second pyrolysis zone B2 is increased by at least from 3% by volume to 13% by volume compared to the oxygen content G(B1) in the first pyrolysis zone B1. According to the invention, preference is also given in this context to the temperature T(B1) in the first pyrolysis zone B1 being set in the range from 375° C. to 475° C. and the temperature T(B2) in the second pyrolysis zone B2 being set in the range from 450° C. to 750° C., but with the proviso that the temperature T(B2) in the second pyrolysis zone B2 is increased by from 50° C. to 250° C. compared to the temperature T(B1) in the first pyrolysis zone B1.

As indicated above, the process conditions according to the invention, in particular the controlled increase in the oxygen content G(B2) and/or the temperature T(B2) in the second pyrolysis zone B2, leads to recycled carbon fibers which at least essentially no longer have any pyrolysis residues and, owing to partial oxidation of the surface, have a more hydrophilic and rougher surface compared to primary carbon fibers or conventionally recycled carbon fibers. This leads to better wettability and incorporability of the recycled carbon fibers resulting from the process conditions according to the invention into plastics compared to primary carbon fibers or conventionally recycled carbon fibers. At the same time, the oxidation of the surface is, however, controlled in a targeted manner according to the invention so that the mechanical properties, in particular the mechanical stability, of the recycled carbon fibers remain essentially unchanged compared to those of primary carbon fibers.

In general, the residence time of the object to be recycled can vary within a wide range:

In particular, the residence time VD(B1) of the object to be recycled in the first pyrolysis zone B1 is in the range from 0.1 to 60 minutes, in particular in the range from 0.5 to 30 minutes, preferably in the range from 0.75 to 15 minutes, particularly preferably in the range from 1 to 10 minutes, very particularly preferably in the range from 1 to 8 minutes. The residence time in the first pyrolysis zone B1 is, in particular, sufficient to ensure at least essentially complete removal of the polymer matrix of the plastic; however, the residence time in the first pyrolysis zone B1 should not exceed a particular time in order to avoid oxidation of the carbon fibers and excessively long process times and thus uneconomical process durations. The residence time VD(B1) can, for example, be set via the transport velocity of the objects to be recycled within the first pyrolysis zone B1 and/or via the spatial length or extension of the first pyrolysis zone B1.

Furthermore, in particular, the residence time VD(B2) of the object to be recycled in the second pyrolysis zone B2 can, according to the invention, be in the range from 0.01 to 30 minutes, in particular in the range from 0.1 to 12 minutes, preferably in the range from 0.5 to 7.5 minutes, particularly preferably in the range from 1 to 6 minutes, very particularly preferably in the range from 2 to 5 minutes. It is advantageous according to the invention for the residence time in the second pyrolysis zone B2 to be controlled in such a way that, firstly, excessive oxidation of the surface of the recycled carbon fibers at elevated temperatures is avoided but, secondly, the pyrolysis residues are at least essentially removed. Since the residence times are dependent on, in particular, the temperature and/or the oxygen content, an increased residence time should be used at low temperatures and/or low oxygen contents while higher temperatures and/or higher oxygen contents result in a lower residence time. In addition, the residence time in the respective pyrolysis zones B1 and B2 is, in particular, also dependent on the dimensions or sizes and also the composition of the object to be recycled. In particular, large-volume objects or resin-impregnated objects can lead to an increased residence time in the first and/or second pyrolysis zones B1 and B2 in order to ensure, firstly, complete removal of the polymer matrix of the plastic and, secondly, complete removal of the pyrolysis residues on the surface of the recycled carbon fibers. The residence time VD(B2) can, for example, be set via the transport velocity of the objects to be recycled within the second pyrolysis zone B2 and/or via the spatial length or extension of the second pyrolysis zone B2.

In this context, the ratio Q of the residence time VD(B1) of the object to be recycled in the first pyrolysis zone B1 to the residence time VD(B2) of the object to be recycled in the second pyrolysis zone B2 can, according to the invention, be at least 1.05, in particular at least 1.1, preferably at least 1.2, more preferably at least 1.3, particularly preferably at least 1.5, and/or not more than 4, in particular not more than 3.5, preferably not more than 3, more preferably not more than 2.75, particularly preferably not more than 2.5. Greater residence times in the first pyrolysis zone B1 compared to the second pyrolysis zone B2 can, in particular, be achieved by the pyrolysis zone B1 having a greater spatial length or extension than the pyrolysis zone B2 and/or by the transport velocity of the objects to be recycled in the first pyrolysis zone B1 being greater than that in the second pyrolysis zone B2.

According to the invention, the ratio Q of the residence time VD(B1) of the object to be recycled in the first pyrolysis zone B1 to the residence time VD(B2) of the object to be recycled in the second pyrolysis zone B2 can preferably satisfy the following inequality:

$1.05 \leq Q \leq 4$, in particular $1.1 \leq Q \leq 3.5$, preferably $1.2 \leq Q \leq 3$, more preferably $1.3 \leq Q \leq 2.75$, particularly preferably $1.5 \leq Q \leq 2.5$ In addition, it can be advantageous according to the invention for the residence time of the object to be recycled in the heating-up zone A to be in the range from 0.05 to 20 minutes, in particular in the range from 0.1 to 15 minutes, preferably in the range from 0.5 to 10 minutes, particularly preferably in the range from 1 to 5 minutes, very particularly preferably in the range from 1.5 to 4 minutes. In this context, it can be advantageous according to the invention for the temperature in the heating-up zone A to be in the range from 50° C. to 350° C., in particular from 100° C. to 325° C., preferably from 150° C. to 300° C., particularly preferably from 205° C. to 295° C. The use of a heating-up zone A is advantageous since the material to be recycled is preheated to a particular temperature and a uniform temperature of the object to be recycled is thus achieved very quickly in the first pyrolysis zone B1. This ensures uniform removal of the polymer matrix of the plastic at relatively short residence times and thus also a constant quality of the recycled carbon fibers since nonuniform removal of the polymer matrix caused by large temperature gradients is avoided. Furthermore, the process times of the process of the invention can be significantly reduced by the use of a heating-up zone A since relatively short residence times in the first pyrolysis zone B1 are made possible by the heating of the object to be recycled to a particular temperature.

In addition, the residence time of the recycled carbon fibers in the cooling zone C can, according to the invention, be in the range from 0.1 to 30 minutes, in particular in the range from 0.5 to 25 minutes, preferably in the range from 1 to 20 minutes, particularly preferably in the range from 5 to 18 minutes, very particularly preferably in the range from 7.5 to 15 minutes. In this context, the temperature in the cooling zone C can, in particular, be in the range from 10° C. to 350° C., in particular from 20° C. to 250° C., preferably from 25° C. to 200° C., particularly preferably from 30° C. to 150° C. The cooling zone C serves to cool the recycled carbon fibers, so that rapid further processing, in particular comminution, packaging and/or storage, is ensured. The cooling zone C can, for example, be cooled with water; alternatively, air can also be used for cooling, which is for example blown into the cooling zone C.

As regards further details of the process of the invention, the process of the invention can in principle be carried out continuously or batchwise, preferably continuously. Carrying out the process of the invention continuously allows an energy-saving and thus economic process since maintenance of a continuous temperature is more economical. Furthermore, heat fluctuations in the pyrolysis zones B1 and B2, which could have an adverse effect on the quality of the recycled carbon fibers and also on the life of the pyrolysis apparatus P, are avoided by means of a continuous process. In addition, the continuous process allows direct processing of the objects to be recycled without complicated storage of the material to be recycled.

In an embodiment which is preferred according to the invention, the pyrolysis apparatus P is configured as a furnace. In this context, the furnace can, according to the invention, be configured as a belt or pass-through furnace, a vertical furnace, chain transport furnace, hood furnace, rocker bar furnace, chamber furnace, soldering furnace, retort furnace, shaft furnace, rotary tube furnace or pusher furnace, preferably as belt or pass-through furnace or rotary tube furnace.

The pyrolysis apparatuses or furnaces described in the documents WO 03/089212 A1, US 2006/246391 A1, DE 2810043 A1, U.S. Pat. No. 402,027 A, AT E 512 775 T1 and US 2010/189629 A1, EP 2 282 879 A1, WO 2010/075952 A1, EP 1 243 663 B1, EP 2 255 940 A1, WO 2010/053381 A1 and DE 10 2005 001 569 B4 are particularly suitable for carrying out the process of the invention.

Furthermore, it is possible, for the purposes of the present invention, for the pyrolysis apparatus P which is, in particular, arranged between the first pyrolysis zone B1 and the second pyrolysis zone B2 to have at least one further pyrolysis zone, in particular at least two further pyrolysis zones, preferably at least three further pyrolysis zones. In this context, it is also possible, according to the invention, for the pyrolysis apparatus P to have, in particular arranged between the first pyrolysis zone B1 and the second pyrolysis zone B2, from 1 to 10 further pyrolysis zones, in particular from 2 to 8 further pyrolysis zones, preferably from 3 to 7 further pyrolysis zones, preferably from 4 to 6 further pyrolysis zones.

In the context of the invention, preference is given to one or more zones of the pyrolysis apparatus P, preferably all zones of the pyrolysis apparatus, not to be physically separated and/or to go over into one another or else for one or more zones of the pyrolysis apparatus P, in particular the first pyrolysis zone B1 and the second pyrolysis zone B2, to be physically separated, in particular by means of one or more locks.

Furthermore, the object to be treated and/or to be recycled can, for the purposes of the present invention, be subjected to a pretreatment, in particular a comminution, upstream of the heating-up zone A. It can be advantageous for the object to be recycled to be subjected to comminution upstream of the heating-up zone A in order to match the maximum size of the object to be recycled to the dimensions of the opening of the pyrolysis apparatus P. In particular, the size of the object to be recycled as it is used thus depends on the dimensions of the pyrolysis apparatus. However, it is also possible for the object to be recycled to be comminuted to a smaller size than that which would be required by the pyrolysis apparatus P used.

In this context, it is also possible for the recycled fibers resulting from the process and/or after the cooling zone C to be subjected to an after-treatment, in particular a comminution, preferably by means of cutting, hacking, milling and/or chopping, and/or, in particular, contacting with at least one treatment agent, preferably selected from among sizes, dispersants, antifoams and binders and also mixtures or combinations thereof. The after-treatment, in particular comminution, of the recycled carbon fibers can be carried out in cutting apparatuses which are customary for this purpose and are known per se to those skilled in the art, with comminution in principle being able to be carried out by means of wet or dry processes. Multiple comminution, in particular multiple hacking, enables the fiber lengths of the recycled carbon fibers to be set to the desired fiber length. In this context, it is also possible for previously hacked carbon fibers to be used for producing milled recycled carbon fibers; the milled carbon fibers can be obtained by milling of the hacked carbon fibers, in particular using mills such as hammer mills, impingement plate mills, screen basket mills or the like. Furthermore, the recycled carbon fibers, in particular the surface of the recycled carbon fibers, can be treated with a treatment agent in order to match the properties of the recycled carbon fibers to the properties of the matrix and thus improve the incorporability thereof into plastics, building materials or cement-containing systems.

The present invention further provides, according to a second aspect of the present invention, recycled carbon fibers which are obtainable by the process of the invention.

The process conditions according to the invention is reflected directly in the recycled carbon fibers which are obtainable by the process of the invention. Owing to the process conditions according to the invention, in particular the partial oxidation of the surface of the pyrolytically produced recycled carbon fibers, these have a rougher surface, in particular grooves, flutes, furrows, depressions or the like. Furthermore, the surface of the recycled carbon fibers of the invention is more hydrophilic than the surface of primary carbon fibers or of conventionally recycled carbon fibers because of the partial oxidation. The rougher and more hydrophilic surface of the recycled carbon fibers of the invention surprisingly leads to improved wettability and thus also to improved incorporability into plastics compared to primary carbon fibers or conventionally recycled carbon fibers.

In a preferred embodiment of the present invention, the recycled carbon fibers have a wettability relative to water, determined as tensiometrically measured contact angle by the Wilhelmy method by means of single fiber measurement at ($23\pm0.5°$) C., of not more than 75°, in particular not more than 73°, preferably not more than 70°, particularly preferably not more than 68°, even more preferably not more than 65°, very particularly preferably not more than 60°.

In this context, it is possible, in particular, for the recycled carbon fibers to have a wettability relative to water, determined as tensiometrically measured contact angle by the Wilhelmy method by means of single fiber measurement at ($23\pm0.5°$) C., in the range from 30° to 75°, in particular from 35° to 73°, preferably from 38° to 70°, particularly preferably from 40° to 68°, even more preferably from 45° to 65°, very particularly preferably from 50° to 60°.

The determination of the wettability of the recycled carbon fibers is carried out by means of a tensiometer using the Wilhelmy method as single fiber measurement at ($23\pm0.5°$) C. relative to water. As regards the Wilhelmy method, reference may be made, in particular, to Abe K., Onishi S., Akijama H., Takiguchi H., Tamada K., Journal of the Surface Science Society of Japan, 2000, 21, pages 643 to 650, and to Baskom W. D., The Wetting Behavior of Fibers, in: Schrader M., Loeb G. Modern Approaches to Wettability: Theory and Applications; Plenum Press, New York 1992, pages 359 to 373. In addition, reference may also be made to the following working examples of the present invention for a detailed description of the contact angle measurements by the Wilhelmy method.

For the purposes of the invention, preference is given to the recycled carbon fibers having a proportion of pyrolysis residues (carbonization residues) of less than 5% by weight, in particular less than 4% by weight, preferably less than 3% by weight, more preferably less than 2% by weight, even more preferably less than 1% by weight, particularly preferably less than 0.9% by weight, most preferably less than 0.5% by weight, based on the recycled carbon fibers.

In particular, it is preferred according to the invention for the recycled carbon fibers to have a proportion of pyrolysis residues (carbonization residues) in the range from 0.001 to 5% by weight, in particular in the range from 0.01 to 4% by weight, preferably in the range from 0.05 to 3% by weight, more preferably in the range from 0.1 to 0.95% by weight, based on the recycled carbon fibers, in particular determined gravimetrically, preferably by means of thermogravimetric analysis. A high proportion of pyrolysis residues on the surface of the recycled carbon fibers leads, on the one hand, firstly to impaired incorporability into plastics, building materials or cement-containing systems and secondly to a significant deterioration in the electrical properties of the recycled carbon fibers. For this reason, the inventive recycled carbon fibers have, according to the invention, an extremely small proportion of pyrolysis residues in order to obtain excellent incorporability and excellent electrical properties. The pyrolysis residues can be determined by means of gravimetric analysis, in particular by means of thermogravimetric analysis (TGA), with thermogravimetric analysis (TGA) being preferred. For a detailed description of gravimetric analysis and thermogravimetric analysis (TGA), reference can be made to the working examples according to the invention.

In addition, the recycled carbon fibers can, for the purposes of the present invention, have oxygen-containing functional groups, in particular polar and/or hydrophilic groups, in particular selected from among phenol, carboxyl, carbonyl, aldehyde, keto, hydroxy and/or oxo groups, on their surface, in particular determined by means of electron spectroscopy for chemical analysis (ESCA), preferably by means of X-ray photoelectron spectroscopy (XPS). The oxygen-containing functional groups on the surface of the recycled carbon fibers, which result from the process conditions according to the invention, lead to a more hydrophilic surface of the recycled carbon fibers, which consequently have better wettability compared to more hydrophobic primary carbon fibers or conventionally recycled carbon fibers. The oxygen-containing functional groups on the surface of the recycled carbon fibers can, in particular, be determined by means of electron spectroscopy for chemical analysis (ESCA), preferably by means of X-ray photoelectron spectroscopy (XPS). For further information regarding the way in which ESCA and XPS measurements are carried out, reference may be made to Levsen K., Physikalische Methoden der Chemie: ESCA, Chemie in unserer Zeit, 10, 1976, pages 48 to 53, and also to the working examples according to the invention.

Furthermore, the recycled carbon fibers can have grooves, flutes, depressions, furrows, scratches, craters or the like on their surface. The process of the invention results in recycled carbon fibers which, in contrast to primary carbon fibers, do not have a smooth surface. This is due to the process conditions according to the invention, in particular the oxidation of the surface on the recycled carbon fibers during the removal of the pyrolysis residues. The rougher surface of the recycled carbon fibers is, apart from the presence of the hydrophilic groups, a reason for the good wettability of the recycled carbon fibers, which are obtained by means of the process according to the invention.

In general, the fiber length of the recycled carbon fibers in the uncomminuted state can vary within a wide range. In particular, the recycled carbon fibers in the uncomminuted state have a fiber length in the range from 0.01 to 5 m, in particular in the range from 0.05 to 3 m, preferably in the range from 0.1 to 2 m, more preferably in the range from 0.2 to 1 m. The dimensions of the recycled carbon fibers obtained by the process of the invention are, in particular dependent on the size of the pyrolysis apparatus P used for recycling and on any comminution steps carried out on the object to be recycled before recycling. As regards the determination of the fiber length and the fiber diameter in general, this can be carried out by means of methods which are well known per se to a person skilled in the art. In particular, the fiber length and the fiber diameter are generally determined by determination methods based on light scattering, in particular X-ray diffraction and/or laser light scattering, but also by optical microscopy, electron microscopy or the like. In addition, the determination of the fiber lengths and fiber diameters in the millimeter range can also be carried out by means of sieve analyses in accordance with DIN 66165. The abovementioned sizes relate, in particular, to an at least essentially fibrous basic structure. Furthermore, reference may be made to the information on size determination given below.

In addition, the recycled carbon fibers can have a tensile strength in the range from 1000 to 6000 MPa, in particular in the range from 1500 to 5000 MPa, preferably in the range from 2000 to 4000 MPa, more preferably in the range from 2500 to 3500 MPa. The determination of the tensile strength can, in particular, be carried out in accordance with EN ISO 527-1.

Furthermore, the recycled carbon fibers can, for the purposes of the present invention, have a modulus of elasticity in the range from 20 to 1000 GPa, in particular in the range from 50 to 800 GPa, preferably in the range from 75 to 600 GPa, more preferably in the range from 100 to 400 GPa, even more preferably in the range from 150 to 300 GPa. The modulus of elasticity can, in particular, be determined in accordance with DIN EN 61.

In addition, the recycled carbon fibers can have an average fiber diameter in the range from 0.1 to 100 µm, in particular in the range from 1 to 50 µm, preferably in the range from 2 to 25 µm, more preferably in the range from 3 to 15 µm, particularly preferably in the range from 4 to 10 µm. The determination of the average fiber diameter can be carried out, for example, by methods of determination based on optical microscopy and/or electron microscopy, as indicated above.

In an embodiment which is preferred according to the invention, the recycled carbon fibers can contain at least one treatment agent on their surface, in particular a treatment agent selected from the group consisting of (i) thermoset polymers, in particular epoxy resins; (ii) thermoplastic polymers, in particular polyolefin resins; (iii) dispersants, in particular fatty amine ethoxides and/or dialkylene glycols; (iv) antifoams, in particular polydialkyl-siloxanes; and also mixtures and combinations thereof. To incorporate the recycled carbon fibers obtainable from the process according to the invention, the recycled carbon fibers can be modified, in particular on their surface, by means of at least one treatment agent in order to improve the surface properties and thus the incorporability of the recycled carbon fibers into plastics, building materials and cement-containing systems or to match the surface properties of the carbon fibers which have been recycled according to the invention to the respective matrix. The adaptation of the surface properties to the respective matrix leads to homogeneous incorporation of the recycled carbon fibers and thus to an effective improvement in or strengthening of the respective matrix.

In addition, for the purposes of the present invention, the recycled carbon fibers can be present in comminuted form, in particular in hacked and/or double hacked and/or milled form. As indicated above, the hacking of the recycled carbon fibers can be carried out in a cutting apparatus which is customary for this purpose and is known per se to a person skilled in the art, with the comminution being able in principle to be carried out by means of wet or dry methods. The fiber lengths of the recycled carbon fibers can be set appropriately by means of multiple comminution or multiple hacking. Furthermore, the milled recycled carbon fibers can be obtained from previously hacked recycled carbon fibers, for example using mills such as hammer mills, impingement plate mills or screen basket mills or the like.

In this context, the comminuted recycled carbon fibers can also have an average fiber length in the range from 0.01 to 200 mm, in particular in the range from 0.1 to 150 mm, preferably in the range from 0.2 to 100 mm, more preferably in the range from 0.5 to 90 mm, particularly preferably in the range from 1 to 80 mm, very particularly preferably in the range from 2 to 70 mm. The determination of the fiber length can, in particular, be carried out by the measurement methods indicated above. Furthermore, the abovementioned fiber length relates to singly comminuted recycled carbon fibers which have a greater fiber length than multiply comminuted recycled carbon fibers. However, this is self-evident to a person skilled in the art.

In addition, the comminuted recycled carbon fibers can have an average fiber length in the range from 0.1 to 70 mm, in particular in the range from 0.5 to 60 mm, preferably in the range from 1 to 50 mm, more preferably in the range from 2 to 40 mm, particularly preferably in the range from 3 to 30 mm, very particularly preferably in the range from 5 to 20 mm. The average fiber length of the recycled carbon fibers can be determined as indicated above. In this context, the abovementioned fiber length relates to doubly comminuted recycled carbon fibers which have a shorter fiber length than singly comminuted recycled carbon fibers.

Furthermore, the comminuted recycled carbon fibers can have an average fiber length in the range from 0.1 to 1000 µm, in particular in the range from 1 to 900 µm, preferably in the range from 5 to 700 µm, more preferably in the range from 10 to 500 µm, particularly preferably in the range from 25 to 400 µm, very particularly preferably in the range from 50 to 350 µm, even more preferably in the range from 75 to 250 µm. The determination of the average fiber length of the abovementioned recycled carbon fibers can be carried out by means of the methods of determination indicated above. In this context, the abovementioned average fiber length of the recycled carbon fibers relates to milled recycled carbon fibers.

Furthermore, as regards the comminuted recycled carbon fibers, the comminuted recycled carbon fibers can have a fiber density in the range from 200 to 5000 kg/m³, in particular in the range from 300 to 4500 kg/m³, preferably in the range from 500 to 4000 kg/m³, more preferably in the range from 700 to 3500 kg/m³, particularly preferably in the range from 1000 to 3000 kg/m$^3$, very particularly preferably in the range from 1200 to 2500 kg/m$^3$, even more preferably in the range from 1500 to 2200 kg/m$^3$. The determination of the fiber density of the recycled carbon fibers can be carried out, in particular, in accordance with DIN 29971.

For further information on this aspect of the invention, reference can be made to what has been said above with regard to the process of the invention, which applies analogously to this aspect of the invention.

Furthermore, the present invention also provides, according to a third aspect of the present invention, for the use of recycled carbon fibers according to the invention as additive, in particular as additive for plastics, building materials or cement-containing systems or for producing carbon fiber-containing plastics or for incorporation into plastics, in particular for compounding, or for producing carbon fiber-containing shaped bodies (e.g. components), molds and sheet-like materials (e.g. nonwovens).

For the purposes of the present invention, thermoplastic polymers, thermoplastic polymer mixtures and thermoset polymers can preferably be used. In particular, the plastic (polymer) can be selected from the group consisting of polycarbonate resins, polyamide resins, saturated polyester resins, polyurethane resins, polyacetal resins, polysulfone resins, polyether sulfone resins (PES), polyphenylene sulfide resins (PPS), polystyrene resins (PS), polyolefin resins, polyvinyl chloride resins, polyether ether ketone resins (PEEK), polyether imide resins (PEI), polyarylene oxide resins, polyamidimide resins, polyacrylate resins, polyimide resins and also mixtures and combinations thereof.

In this context, the recycled carbon fibers of the invention can, in particular, be provided for compounding, in particular for incorporation into plastics. In particular, incorporation of the recycled carbon fibers of the invention results in an upgrading of the plastics and/or, in particular, an improvement in the mechanical properties.

For further information on this aspect of the invention, reference may be made to what has been said above with regard to the two other aspects of the invention, which applies analogously to this aspect of the invention.

In addition, the present invention also provides, according to a fourth aspect of the present invention, plastics, building materials or cement-containing systems which comprise recycled carbon fibers according to the present invention, as have been described in detail above, or have been produced using recycled carbon fibers obtainable by the process of the invention, as have been described in detail above. For further information on this aspect of the invention, reference can be made to what has been said above with regard to the other aspects of the invention, which applies analogously to this aspect of the invention.

Finally, the present invention further provides, according to a fifth aspect of the present invention, shaped bodies (e.g. components), molds and sheet-like materials (e.g. nonwovens), in particular in the form of composite materials or compounds which comprise recycled carbon fibers according to the present invention, as have been described in detail above, or which have been produced using recycled carbon fibers obtainable by the process of the invention, as have been described in detail above. For further information on this aspect of the invention, reference can be made to what has been said above with regard to the other aspects of the invention, which applies analogously to this aspect of the invention.

Further advantages, properties, aspects and features of the present invention may be derived from the following description of preferred illustrative embodiments shown in the drawings. The above-described features and/or the features disclosed in the claims and/or in the following description of the figures can, if required, also be combined with one another even if this is not expressly described in detail.

Figure 1:
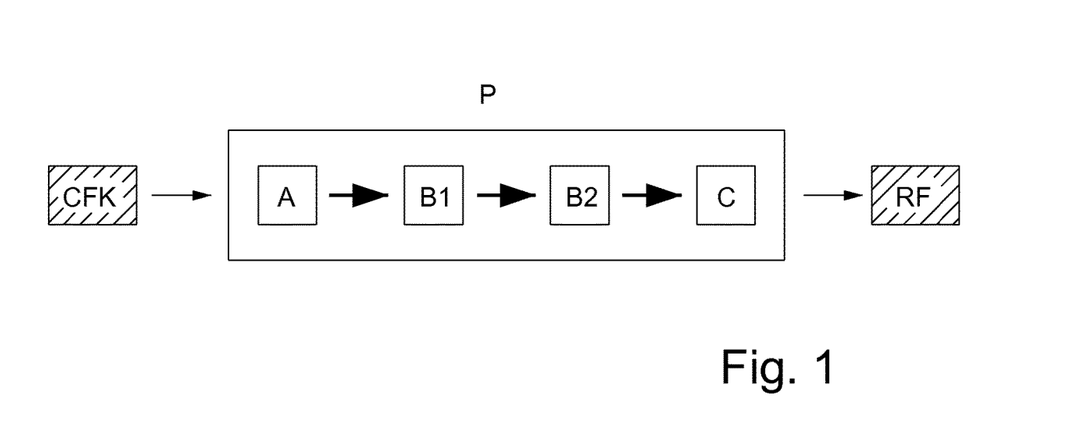
FIG. 1 schematically shows a flow diagram of the process of the invention for recovering (recycling) carbon fibers from carbon fiber-containing plastics as per a preferred embodiment of the process of the invention.
Figure 2A:
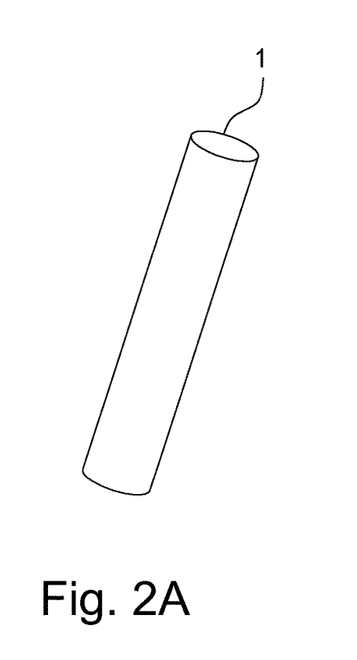
FIG. 2A schematically shows a depiction of a primary carbon fiber 1 having a smooth surface.
Figure 2B:
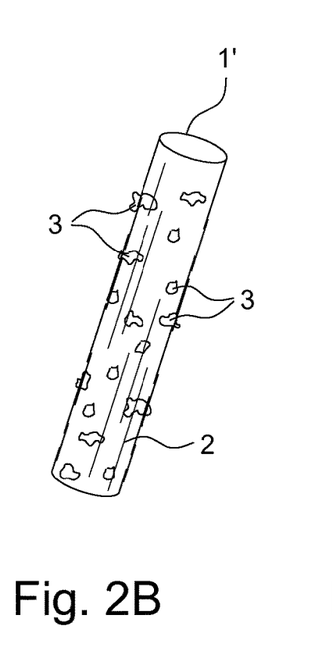
FIG. 2B schematically shows a depiction of a recycled carbon fiber 1' which has been obtained by a noninventive process and has pyrolysis or carbonization residues 3 and also grooves 2.
Figure 2C:
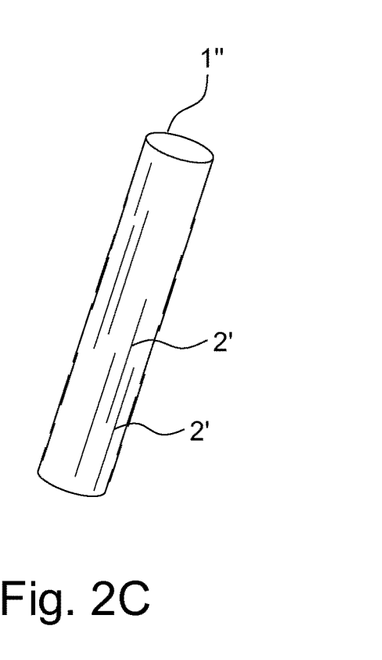
FIG. 2C schematically shows a depiction of a recycled carbon fiber 1" which has been obtained by the process of the invention and has grooves 2".

In the figures:

FIG. 1 schematically shows a flow diagram of the process of the invention for recovering (recycling) carbon fibers from carbon fiber-containing plastics as per a preferred embodiment of the process of the invention;

FIG. 2A schematically shows a depiction of a primary carbon fiber 1 having a smooth surface;

FIG. 2B schematically shows a depiction of a recycled carbon fiber 1' which has been obtained by a noninventive process and has pyrolysis or carbonization residues 3 and also grooves 2; and FIG. 2C schematically shows a depiction of a recycled carbon fiber 1" which has been obtained by the process of the invention and has grooves 2".

FIG. 1 schematically shows, according to a preferred embodiment of the invention, a flow diagram of the process of the invention for recovering (recycling) carbon fibers from carbon fiber-containing plastics. The polymer matrix of the carbon fiber-containing plastic CFP to be treated is firstly heated to a defined temperature in a heating-up zone A in a pyrolysis apparatus P and in the subsequent step subjected to selective pyrolysis at a defined temperature and a defined oxygen content in a first pyrolysis zone B1. In a second pyrolysis zone B2 following the first pyrolysis zone B1, the final pyrolysis of the remaining polymer matrix of the carbon fiber-containing plastic CFP up to the at least essentially complete removal of the polymer matrix and also the complete removal of pyrolysis residues on the surface of the recycled carbon fibers are carried out at a defined temperature and a defined oxygen content. Cooling is subsequently carried out in a cooling zone C, so that the recycled carbon fibers RF obtained in this way are finally obtained.

FIG. 2A schematically shows a primary carbon fiber 1 which has a smooth surface structure.

FIG. 2B schematically shows a recycled carbon fiber 1' obtained by a process which is not according to the invention. The surface of the recycled carbon fiber 1' has grooves 2 which arise as a result of oxidation of the surface of the carbon fiber during recycling. Furthermore, a significant amount of pyrolysis or carbonization residues 3 is present on the surface of the recycled carbon fiber 1'. Owing to the significant amount of pyrolysis or carbonization residue 3, the incorporability of the recycled carbon fiber 1' obtained by a process which is not according to the invention into plastics is not better, or not significantly better, than the incorporability of the primary carbon fiber 1.

FIG. 2C schematically shows a recycled carbon fiber 1" obtained by the process of the invention. The surface of the recycled carbon fiber has grooves 2' as a result of oxidation of the recycled carbon fiber during recycling. However, owing to the process conditions according to the invention, there are no pyrolysis or carbonization residues on the surface of the recycled carbon fiber 1" according to the invention. The recycled carbon fiber 1" according to the invention thus has significantly improved incorporability into plastics both compared to the primary carbon fiber 1 and compared to the carbon fiber 1' which has not been recycled according to the invention.

The schematic depictions in FIGS. 2A, 2B and 2C correspond to microscopic analyses carried out by the applicant on the respective products.

As indicated above, the present invention is associated with many advantages and peculiarities, among which some aspects will be presented below, without implying a restriction:

An advantage of the present invention is, in particular, that the polymer matrix is removed without leaving a residue as a result of the control of the oxygen content and/or the temperature during pyrolysis and in addition the recycled carbon fibers resulting from the process of the invention do not have any pyrolysis or carbonization residues which reduce the quality of the recycled carbon fibers and can make renewed incorporation into plastics more difficult.

Furthermore, the surface of the recycled carbon fibers is partially oxidized as a result of the process conditions according to the invention, i.e. the surface is rougher and there is a higher proportion of oxygen-containing groups such as hydroxy, aldehyde, carboxyl groups, etc., on the surface of the recycled carbon fibers obtained according to the invention. The at least partially oxidized surface of the recycled carbon fibers of the invention leads, as a result of the interaction between the oxygen-containing groups on the surface of the recycled carbon fibers and the polymer matrix and also as a result of the increase in the surface area of the recycled carbon fibers due to roughening, to improved incorporability into plastics compared to primary carbon fibers and compared to conventionally recycled carbon fibers.

In addition, the process conditions according to the invention, in particular the control of the temperature and of the oxygen content, during the entire pyrolysis avoids excessive oxidation of the recycled carbon fibers, so that the recycled carbon fibers of the invention have a comparable mechanical stability to primary carbon fibers.

In addition, owing to the strongly exothermic reaction of oxygen with the gaseous decomposition products of the polymer matrix, significantly less heat energy is required for carrying out the process of the invention, so that the process of the invention is extremely economical. Furthermore, the respective temperatures necessary for the pyrolysis can also be reached very quickly because of the strongly exothermic reaction, so that short residence times of the objects to be recycled result according to the process of the invention. Consequently, large amounts of carbon fiber-containing plastics can be recycled in a short time by means of the pyrolysis plant of the invention in combination with the process of the invention.

Before carrying out the process of the invention, it is not necessary to carry out any mechanical and/or chemical pretreatment of the carbon fiber-containing plastics to be recycled, so that recycled carbon fibers having a long fiber length, from which, after addition of a resin, prepregs can, for example, be produced, are obtained. However, the recycled carbon fibers having a long fiber length can also be comminuted to defined fiber lengths as are used, for example, in compounding.

It is also possible to recycle laminar strips of carbon fiber-containing plastics and other reinforcing materials such as glass fibers without complicated separation in the process of the invention since the process of the invention results in individual strip layers of recycled carbon fibers from which other reinforcing materials can easily be removed.

In addition, the process of the invention allows continuous operation and implementation on an industrial scale, too.

Further embodiments, modifications and variations of the present invention can readily be recognized and realized by a person skilled in the art on reading the description, without going outside the scope of the present invention.

The present invention is illustrated with the aid of the following working examples, but these do not restrict the present invention.

WORKING EXAMPLES

The particular advantages of the invention are described below for the example of the recovery (recycling) of carbon fibers from carbon fiber-containing materials.

A) Process for Recycling Carbon Fiber-Containing Plastics

Carbon fiber-reinforced plastic scrap (CFP scrap) as is obtained, for example, in aircraft construction (e.g. aircraft airfoils) or from wind power turbines (e.g. wind blades) is used as carbon fiber-containing plastics. If the pieces of CFP scrap have dimensions larger than the opening of the pyrolysis apparatus, comminution of the CFP scrap is carried out by means of cutting apparatuses which are known per se to those skilled in the art before recycling.

The process for recycling of carbon fibers from the above-described carbon fiber-containing scrap is carried out in a pyrolysis apparatus as per FIG. 1 which has a heating-up zone A, a first pyrolysis zone B1, a second pyrolysis zone B2 and a cooling zone C. The offgases or gaseous decomposition products of the polymer matrix of the plastic formed during the pyrolysis are decomposed or burnt in an offgas treatment apparatus which is connected to the first and second pyrolysis zones B1 and B2. Furthermore, the pyrolysis apparatus has oxygen-sensitive sensors in the first pyrolysis zone B1 and in the second pyrolysis zone B2. In addition, temperature sensors for determining the temperature in the respective zone are provided in the heating-up zone A, in the first pyrolysis zone B1, in the second pyrolysis zone B2 and in the cooling zone C. In the heating-up zone A, in the first pyrolysis zone B1 and in the second pyrolysis zone B2, there are also a plurality of heating elements for providing the respective temperature, with the heating elements being able to be controlled as a function of the temperatures determined by the temperature sensors in the respective zone. The cooling of the recycled carbon fibers in the cooling zone C is effected by means of water cooling. In this context, it is possible to use methods known per to those skilled in the art, e.g. jacket cooling. Furthermore, the first pyrolysis zone B1 and the second pyrolysis zone B2 have venting devices which can be opened or closed as a function of the oxygen content determined. The venting devices are connected to the offgas treatment apparatus, so that the gaseous decomposition products taken off through the venting devices can be decomposed or burnt in the offgas treatment apparatus. The temperature in the heating-up zone A is in each case set to from 205 to 295° C., while the temperature in the cooling zone C is in each case from 80 to 150° C.

The recycling of carbon fiber-containing plastics in the form of prepregs is carried out in the above-described pyrolysis apparatus, with the temperatures $T(B1)$ and $T(B2)$ in the first and second pyrolysis zones B1 and B2, the oxygen content $G(B1)$ and $G(B2)$ in the first and second pyrolysis zones B1 and B2 and also the residence times $VD(B1)$ and $VD(B2)$ in the first and second pyrolysis zones B1 and B2 being varied in each care.

The precise process conditions of the recycling operations carried out are shown in table 1 below.

TABLE 1

Process conditions for recycling of carbon fiber-containing plastics

| No. | T (B1) | T (B2) | G (B1) | G (B2) | VD (B1) | Vd (B2) |
|---|---|---|---|---|---|---|
| 1 | 430-445° C. | 450-480° C. | 2% by volume | 2% by volume | 28 min | 22 min |
| 2* | 430-445° C. | 515-650° C. | 2% by volume | 10% by volume | 28 min | 22 min |
| 3 | 430-445° C. | 755-765° C. | 8% by volume | 8% by volume | 28 min | 22 min |
| 4 | 430-445° C. | 590-610° C. | 10% by volume | 10% by volume | 28 min | 22 min |
| 5 | 430-445° C. | 590-610° C. | 2% by volume | 2% by volume | 28 min | 22 min |
| 6 | 540-560° C. | 540-560° C. | 2% by volume | 2% by volume | 28 min | 22 min |

*according to the invention

The surface structure, the proportion of pyrolysis residues and the oxygen-containing groups on the surface of the recycled carbon fibers obtained by recycling under various process conditions are determined by means of the measurement methods described below.

B) Measurement Methods and Results a) Optical Microscopic Examinations of the Recycled Carbon Fibers The nature of the surface and the presence of pyrolysis residues is examined by means of scanning electron microscopy (SEM). Suitable scanning electron microscopes are well known to those skilled in the art. In this context, it is possible to use, for example, scanning electron microscopes of the model JEOL 6400 F or Hitachi S-3200. The resolution of the scanning electron microscopic data is determined by the resolution of the scanning electron microscope. The results for the various process conditions obtained by means of scanning electron microscopy are shown in table 2 below.

TABLE 2

Results of the scanning electron microscopic examination

| NO. | Result of scanning electron microscopic examinations |
|---|---|
| 1 | Very smooth surface, polymer matrix of the plastic removed in part, not completely, many pyrolysis residues on the fiber surface |
| 2* | Rough surface in the form of grooves and depressions, no visible damage to the fiber surface, no pyrolysis residues on the fiber surface, polymer matrix removed completely |
| 3 | Severe damage to the carbon fiber, some severe depressions or holes, rough surface in the form of grooves, no pyrolysis residues on the fiber surface |
| 4 | Severe damage to the carbon fibers, some holes in the surface, rough structure in the form of grooves, no pyrolysis residues on the fiber surface |
| 5 | Barely any grooves or depressions in the surface, no damage to the carbon fiber, many pyrolysis residues on the fiber surface |
| 6 | Damage to the carbon fiber, some deep grooves and destruction of the structure, many pyrolysis residues on the fiber surface |

*according to the invention

It has surprisingly been found that only when using defined oxygen contents and temperatures in the first and second pyrolysis zones B1 and B2 are recycled carbon fibers which have no significant damage to the fiber surface but, as a result of oxidation in the second pyrolysis zone B2, have a rougher surface in the form of grooves obtained. Furthermore, the pyrolysis residue can be substantially completely avoided by using a higher temperature T(B2) in the second pyrolysis zone B2 and a higher oxygen content G(B2) in the second pyrolysis zone B2, so that neither the incorporability nor the mechanical properties, in particular the stiffness and the elongation, nor the electrical properties are significantly influenced by recycling (cf. Sample No. 2). In particular, the recycled carbon fibers have, when process conditions according to the invention are employed (cf. Sample No. 2), a virtually identical stiffness and an elongation which is only from about 5% to 10% lower compared to primary carbon fibers. If the oxygen content G(B2) and the temperature T(B2) in the second pyrolysis zone B2 are set to values which are too low (cf. sample No. 1), incomplete removal of the polymer matrix occurs and considerable amounts of pyrolysis residues can be observed on the fiber surface. If, on the other hand, the temperature T(B2) is increased too greatly in the second pyrolysis zone (cf. sample No. 3), partial destruction of the recycled carbon fibers occurs as a result of the high temperature in combination with the high oxygen content, so that the mechanical properties of the recycled carbon fibers are significantly impaired. When oxygen contents are kept the same in the first and second pyrolysis zones B1 and B2 (cf. samples No. 4 and 5), either destruction of the fibers due to the excessively high oxygen content G(B1) in the first pyrolysis zone B1 occurs (cf. sample No. 4) or incomplete removal of the pyrolysis residues occurs because of the oxygen content G(B2) being too low in the second pyrolysis zone B2 (cf. sample No. 5). The constant temperature in the first and second pyrolysis zones B1 and B2 (cf. sample No. 6) also leads to a significant amount of pyrolysis residues and some damage to the fibers as a result of the excessively high temperatures T(B1) in the first pyrolysis zone B1.

b) Contact angle measurement by means of the Wilhelmy method

The contact angle measurements on recycled carbon fibers obtained through the various process conditions are determined by means of a tensiometer, e.g. a K100SF tensiometer from KRÜSS GmbH, Hamburg, Germany. The contact angle measurements are carried out as individual fiber measurements relative to water.

For this purpose, the respective recycled carbon fibers are firstly comminuted to a length of from 0.8 to 1 cm. The comminution of the respective recycled carbon fibers can, for example, be effected by hacking in a cutting apparatus which is customary for this purpose and is known per se to those skilled in the art, with the comminution being able in principle to be carried out by means of wet or dry methods.

The comminuted recycled carbon fibers are fixed with the aid of a sample holder to the force sensor (weighing system) of the tensiometer, the test liquid, in the present case water, is introduced into a measurement vessel (glass, diameter 70 mm, volume about 70 ml) and positioned in a temperature controlled unit of the tensiometer under the force sensor. The wetted length of the respective individual fibers relative to n-heptane is firstly determined. The parameters of the n-heptane test liquid and of the water required for the measurement are shown in the following table.

TABLE 3

Parameters of the test liquids

| Test liquid | σ [mN/m] | ρ [g/cm³] |
|---|---|---|
| n-Heptane | 20.4 | 0.684 |
| Water | 72.80 | 0.998 |

The measurement of the contact angles and of the wetted length is carried out at a temperature of (23° C.±0.5°) C., with the determination of the dynamic contact angle being progressive angle. A double determination is carried out for each recycled carbon fiber.

The detection speed is 6 mm/min, the measurement speed is 1 mm/min, the sensitivity is 0.0004 mg and the depth to which the fibers dip in (position) is 5 mm.

The contact angle is automatically determined or calculated from the force changes at the recycled carbon fiber in contact with water registered at the force sensor and as a function of the position, the surface tension of the water and the previously determined wetted length of the recycled carbon fiber by means of software (e.g. Labdesk Software from KRÜSS GmbH, Hamburg, Germany), with in the present case the determination being carried out as on-line contact angle.

The wetted length of the recycled carbon fibers and the contact angles are shown in table 4 below.

TABLE 4

Wetted length and contact angle of the recycled carbon fibers

| No. | Wetted length [mm] | Contact angle [°] |
|---|---|---|
| 1 | 0.025 ± 0.000 | 84.40 ± 0.04 |
| 2* | 0.025 ± 0.001 | 69.80 ± 0.30 |
| 5 | 0.023 ± 0.001 | 77.75 ± 0.92 |

*according to the invention

The contact angles for Sample Nos. 3, 4 and 6 could not be determined because of the strong destruction of the recycled carbon fibers. Furthermore, it was surprisingly found that oxidation of the surface takes place when using higher temperatures T(B2) and higher oxygen contents G(B2) in the second pyrolysis zone B2, so that a hydrophilic surface results (Sample No. 2). This is made clear by the lower contact angle compared to Sample No. 1, which owing to the low temperatures T(B2) in the second pyrolysis zone B2 does not have a hydrophilic surface. Sample No. 5, too, has a higher contact angle than the inventive Sample No. 2 since, owing to the low oxygen content G(B2) in the second pyrolysis zone B2, no oxidation of the recycled carbon fibers has taken place, and thus there is also no hydrophilic surface. Overall, it has surprisingly been found that due to the process conditions according to the invention oxidation of the surface of the recycled carbon fibers takes place, but without damaging these significantly so that the mechanical properties of the recycled carbon fibers of the invention are retained.

The more hydrophilic surface results in better incorporability into plastics, building materials or cement-containing systems compared to primary carbon fibers which have a contact angle above 75° C. (i.e. are more difficult to wet).

c) Gravimetric and Thermogravimetric Analysis (TGA)

The gravimetric determination of the pyrolysis residue can be carried out by suspending a precisely determined amount of the respective recycled carbon fibers in a solvent such as dichloromethane, subsequently treating the suspension in an ultrasonic bath, filtering the suspension through a coarse sieve which holds back only the carbon fibers and reweighing the dried recycled carbon fibers. The proportion of pyrolysis residues is given by the difference between the weight of the recycled carbon fibers before and after the treatment with the solvent such as dichloromethane.

In the present case the proportion of pyrolysis residues was determined by means of thermogravimetric analysis (TGA). The thermogravimetric analysis (TGA) can be carried out using measurement apparatuses which are known per se to a person skilled in the art. In the present case, the recycled carbon fibers obtained by the various process conditions of the recycling were firstly finely comminuted, with comminution being able to be carried out using comminution methods known per se to a person skilled in the art, in particular using cutting apparatuses or mills such as hammer mills, impingement plate mills, screen basket mills. After comminution of the respective sample, 1 mg of the comminuted recycled carbon fibers obtained using the various process conditions is transferred into the measurement apparatus and the thermogravimetric analysis is carried out using the following parameters: the air flow velocity is 20 cm³/s, the heating up rate of the temperature is 10° C./min and the recording speed is 1/s. The residues which vaporize up to about 550° C., which are the pyrolysis residues, are determined by weighing the sample before and after the thermogravimetric analysis. The determination can be carried out, for example, by means of a microbalance.

In the case of Sample No. 2, no weight losses were found, so that the process conditions according to the invention do not result in significant amounts of pyrolysis residues. In particular, the recycled carbon fibers produced in accordance with the process of the invention have pyrolysis residues of less than 0.1% by weight. The Samples No. 1 and 3 to 6 which are not according to the invention each have significant amounts of pyrolysis residues of in each case more than 5% by weight. In the case of Sample No. 4, however, no significant amounts of pyrolysis residues could be determined, but—brought about by the process conditions—severe damage to the recycled carbon fibers, as mentioned above, was determined by scanning electron microscopy.

d) X-Ray Photoelectron Spectroscopy (XPS)

Finally, the type and amount of the oxygen containing groups on the surface of the recycled carbon fibers produced by the different process conditions were determined by means of X-ray photoelectron spectroscopy (XPS).

The respective recycled carbon fibers are applied in bundles to a spacer which is made of stainless steel and has a diameter of 1 cm and is provided with double-sided adhesive tape. The ends of the bundle of recycled carbon fibers are subsequently fixed to the spacer by use of a further adhesive tape. All six samples are placed at a distance of about 5 mm from one another on this spacer.

The X-ray photoelectron spectroscopy can be carried out using measurement instruments suitable for this purpose, for example a Kratos AXIS ULTRA, using a monochromatic Al-Kα X-ray electron source (1486.6 eV) at an emission current of 15 mA and an anode potential of 10 kV. The spectra are recorded in the range from 0 to 1100 eV, with the transmission energy being 80 eV and the step size being set to 0.5 eV. All spectra are recorded using a 90° angle of reflection. In each case, three positions in the middle of the sample are measured, with the surface area of the sample being 300 μm×700 μm in each case.

The composition of the surface is calculated by means of software such as CasaXPS.

As surprisingly established by the applicant, the carbon fibers of Sample No. 2 which have been recycled according to the invention have higher concentrations of keto and carboxylate groups on the surface than the Samples No. 1 and 5 which are not according to the invention. Samples No. 3, 4 and 6 have, on account of the extremely strong oxidation, an even higher proportion of keto and carboxylate groups than the recycled carbon fibers of the invention, however the recycled carbon fibers of Samples No. 3, 4 and 6 are partially destroyed due to the processes.

The increased proportion of oxygen-containing groups, in particular keto and carboxylate groups, leads to a more hydrophilic surface of the recycled carbon fibers of the invention. This more hydrophilic surface leads to better incorporability because of the better wettability of the surface.

C) Further Recycling Experiments Carried Out

In addition, further pyrolysis experiments according to the invention are carried out under the general process conditions specified above in the same pyrolysis apparatus using carbon fiber-reinforced plastic scrap (CFP scrap) in the form of prepregs. The precise process conditions of the recycling experiments carried out are shown in table 5 below.

TABLE 5

Process conditions for recycling carbon fiber-containing plastics

| No. | T (B1) | T (B2) | G (B1) | G (B2) | VD (B1) | VD (B2) |
|---|---|---|---|---|---|---|
| 2a* | 380-395° C. | 450-470° C. | 0.8% by volume | 14% by volume | 35 min | 15 min |
| 2b* | 435-450° C. | 520-640° C. | 1.5% by volume | 12% by volume | 29 min | 21 min |
| 2c* | 455-470° C. | 460-515° C. | 1% by volume | 9% by volume | 27 min | 23 min |
| 2d* | 430-445° C. | 590-610° C. | 3% by volume | 8% by volume | 26 min | 24 min |

*according to the invention

The surface structure, the proportion of pyrolysis residues and the oxygen-containing groups on the surface of the recycled carbon fibers obtained by recycling under various process conditions are determined by means of the above-described measurement methods and display comparable results to the above-described sample No. 2 according to the invention.

The microscopic studies on the recycled carbon fibers of samples No. 2a-d according to the invention show that all experiments result in recycled carbon fibers which have a rough surface in the form of grooves and depressions but no visible damage to the fiber surface and no pyrolysis residues on the fiber surface.

The results of the contact angle measurements by the Wilhelmy method are shown in table 6 below:

TABLE 6

Wetted length and contact angle of the recycled carbon fibers

| No. | Wetted length [mm] | Contact angle [°] |
|---|---|---|
| 2a* | 0.028 ± 0.000 | 65.45 ± 0.11 |
| 2b* | 0.025 ± 0.001 | 67.78 ± 0.25 |
| 2c* | 0.023 ± 0.001 | 69.65 ± 0.82 |
| 2d* | 0.024 ± 0.001 | 70.16 ± 0.22 |

*according to the invention

| List of reference symbols: | |
|---|---|
| P | pyrolysis apparatus |
| A | Heating-up zone |
| B1 | First pyrolysis zone |
| B2 | Second pyrolysis zone |
| C | Cooling zone |
| CFP | Carbon fiber-containing plastic |
| RF | Recycled carbon fibers |
| 1 | Primary carbon fiber |
| 1' | Recycled carbon fiber (not according to the invention) |
| 1" | Recycled carbon fiber (according to the invention) |
| 2 | Grooves on a recycled carbon fiber 1' (not according to the invention) |
| 2' | Grooves on a recycled carbon fiber 1" (according to the invention) |
| 3 | pyrolysis or carbonization residue |

The invention claimed is:

1. A process for producing recovered carbon fibers RF from carbon fiber-containing plastics,
wherein the process comprises: an object to be treated and to be recycled based on a carbon fiber-containing plastic which comprises carbon fibers in a polymer matrix is subjected to a multistage pyrolysis in the presence of oxygen, with the polymer of the polymer matrix being decomposed during the multistage pyrolysis to form decomposition products originating from the decomposition of the polymer matrix and introduction of oxygen, and to take off the decomposition products from the carbon fibers to give the recovered carbon fibers RF;
wherein the multistage pyrolysis is carried out by passing the object to be treated and to be recycled through a pyrolysis apparatus P, wherein the pyrolysis apparatus P comprises at least the following treatment zones in the order specified below and the object to be treated and to be recycled goes through the following treatment zones in this order:

(A) a heating-up zone A in which the object to be treated and to be recycled is heated to a defined temperature T(A), (B1) subsequent to the heating-up zone A, a first pyrolysis zone B1 in which a pyrolysis of some of the polymer of the polymer matrix of the object to be treated and to be recycled occurs and is carried out at a defined temperature T(B1) and a defined oxygen content G(B1), (B2) subsequent to the first pyrolysis zone B1, a second pyrolysis zone B2 in which a final pyrolysis of the polymer of the polymer matrix of the object to be treated and to be recycled still present after the first pyrolysis zone B1, the final pyrolysis is carried out at a defined temperature T(B2) and a defined oxygen content G(B2) to at least essentially complete removal of the polymer of the polymer matrix of the object to be treated and to be recycled, forming the recovered carbon fibers RF, (C) subsequent to the second pyrolysis zone B2, a cooling zone C for cooling the recovered carbon fibers RF obtained from the second pyrolysis zone B2;

wherein the defined oxygen content G(B2) in the second pyrolysis zone B2 is increased compared to the defined oxygen content G(B1) in the first pyrolysis zone B1 and wherein the defined temperature T(B2) in the second pyrolysis zone B2 is increased compared to the defined temperature T(B1) in the first pyrolysis zone B1, wherein the defined oxygen content G(B1) in the first pyrolysis zone B1 is set in the range from 0.1% by volume to 12% by volume and the defined oxygen content G(B2) in the second pyrolysis zone B2 is set in the range from 5% by volume to 17% by volume, however, with the proviso that the defined oxygen content G(B2) in the second pyrolysis zone B2 is increased by at least 3% by volume compared to the defined oxygen content G(B1) in the first pyrolysis zone B1, and wherein the defined temperature T(B2) in the second pyrolysis zone B2 is increased by from 25° C. to 300° C. compared to the defined temperature T(B1) in the first pyrolysis zone B1.

2. The process as claimed in claim 1, wherein the defined oxygen content G(B2) in the second pyrolysis zone B2 is increased by from 5% by volume to 15% by volume, compared to the defined oxygen content G(B1) in the first pyrolysis zone B1.

3. The process as claimed in claim 1, wherein the defined oxygen content G(B1) in the first pyrolysis zone B1 is set in the range from 0.5% by volume to 10% by volume and the defined oxygen content G(B2) in the second pyrolysis zone B2 is set in the range from 5% by volume to 17% by volume, however, with the proviso that the defined oxygen content G(B2) in the second pyrolysis zone B2 is increased by from 7.5% by volume to 15% by volume, compared to the defined oxygen content G(B1) in the first pyrolysis zone B1.

4. The process as claimed in claim 1, wherein the defined oxygen content G(B1) and G(B2) in the first and second pyrolysis zones B1 and B2, respectively, is controlled in such a way that the defined oxygen content G(B1) in the first pyrolysis zone B1 is set substoichiometrically in relation to the polymer matrix to be decomposed and the defined oxygen content G(B2) in the second pyrolysis zone B2 is set superstoichiometrically in relation to the polymer matrix to be decomposed.

5. The process as claimed in claim 1, wherein the defined oxygen content G(B1) in the first pyrolysis zone B1, or the defined oxygen content G(B2) in the second pyrolysis zone B2, during the multistage pyrolysis is controlled by at least one of taking off decomposition products originating from the decomposition of the polymer matrix and introduction of oxygen.

6. The process as claimed in claim 1, wherein the defined oxygen content G(B1) in the first pyrolysis zone B1, or the defined oxygen content G(B2) in the second pyrolysis zone B2, during the multistage pyrolysis is measured by means of oxygen measurement devices.

7. The process as claimed in claim 1, wherein the defined oxygen content G(B1) in the first pyrolysis zone B1, and the defined oxygen content G(B2) in the second pyrolysis zone B2, during the multistage pyrolysis is controlled in such a way that only the polymer matrix is pyrolyzed selectively in the first pyrolysis zone B1, forming pyrolysis residues, and only the polymer matrix still remaining after the first pyrolysis zone B1 and pyrolysis residues are removed selectively and the surface of the carbon fibers is at least partially oxidized in the second pyrolysis zone B2, producing recovered carbon fibers RF.

8. The process as claimed in claim 1, wherein the defined temperature T(B2) in the second pyrolysis zone B2 is increased by from 50° C. to 250° C., compared to the defined temperature T(B1) in the first pyrolysis zone B1.

9. The process as claimed in claim 1, wherein the defined temperature T(B1) in the first pyrolysis zone B1 is set in the range from 375° C. to 475° C. and the defined temperature T(B2) in the second pyrolysis zone 82 is set in the range from 450° C. to 750° C., however, with the proviso that the defined temperature T(B2) in the second pyrolysis zone B2 is increased by from 25° C. to 300° C., compared to the defined temperature T(B1) in the first pyrolysis zone B1.

10. The process as claimed in claim 1, wherein the defined temperature T(B1) in the first pyrolysis zone B1, or the defined temperature T(B2) in the second pyrolysis zone B2, during the multistage pyrolysis is controlled via temperature measurement devices.

11. The process as claimed in claim 1, wherein the defined temperature T(B1) in the first pyrolysis zone B1, and the defined temperature T(B2) in the second pyrolysis zone B2, during the multistage pyrolysis is controlled in such a way that only the polymer matrix is pyrolyzed at least essentially selectively in the first pyrolysis zone B1, forming pyrolysis residues, and only the polymer matrix still remaining after the first pyrolysis zone B1 and pyrolysis residues are removed selectively and the surface of the carbon fibers is at least partially oxidized in the second pyrolysis zone B2, producing recovered carbon fibers RF.

12. The process as claimed in claim 1, wherein the defined oxygen content G(B2) in the second pyrolysis zone B2 is increased compared to the defined oxygen content G(B1) in the first pyrolysis zone B1 and the defined temperature T(B2) in the second pyrolysis zone B2 is increased compared to the defined temperature T(B1) in the first pyrolysis zone B1;

wherein the defined oxygen content G(B1) in the first pyrolysis zone B1 is set in the range from 0.5% by volume to 10% by volume and the defined oxygen content G(B2) in the second pyrolysis zone B2 is set in the range from 5% by volume to 17% by volume, however, with the proviso that the defined oxygen content G(B2) in the second pyrolysis zone B2 is increased by from 10% by volume to 15% by volume compared to the defined oxygen content G(B1) in the first pyrolysis zone B1, and wherein the defined temperature T(B1) in the first pyrolysis zone B1 is set in the range from 375° C. to 475° C. and the defined temperature T(B2) in the second pyrolysis zone B2 is set in the range from 450° C. to 750° C., however, with the proviso that the defined temperature T(B2) in the second pyrolysis zone B2 is increased by from 25° C. to 300° C., compared to the defined temperature T(B1) in the first pyrolysis zone B1.

13. The process as claimed in claim 1, wherein the defined oxygen content G(B2) in the second pyrolysis zone B2 is increased compared to the defined oxygen content G(B1) in the first pyrolysis zone B1 and the defined temperature T(B2) in the second pyrolysis zone B2 is increased compared to the defined temperature T(B1) in the first pyrolysis zone B1;

wherein the defined oxygen content G(B1) in the first pyrolysis zone B1 is set in the range from 0.75% by volume to 6% by volume and the defined oxygen content G(B2) in the second pyrolysis zone B2 is set in the range from 6% by volume to 14% by volume, however, with the proviso that the defined oxygen content G(B2) in the second pyrolysis zone B2 is increased by at least from 3% by volume to 13% by volume, compared to the defined oxygen content G(B1) in the first pyrolysis zone B1, and wherein the defined temperature T(B1) in the first pyrolysis zone B1 is set in the range from 375° C. to 475° C. and the defined temperature T(B2) in the second pyrolysis zone B2 is set in the range from 450° C. to 750° C., however, with the proviso that the defined temperature T(B2) in the second pyrolysis zone B2 is increased by from 50° C. to 250° C., compared to the defined temperature T(B1) in the first pyrolysis zone B1.

14. The process as claimed in claim 1, wherein the object to be treated and to be recycled has a residence time VD(B1) in the first pyrolysis zone B1 and a residence time VD(B2) in the second pyrolysis zone B2, wherein the residence time VD(B1) of the object to be treated and to be recycled in the first pyrolysis zone B1 is in the range from 0.1 to 60 minutes; and wherein the residence time VD(B2) of the object to be treated and to be recycled in the second pyrolysis zone B2 is in the range from 0.01 to 30 minutes.

15. The process as claimed in claim 1, wherein the object to be treated and to be recycled has a residence time VD(B1) in the first pyrolysis zone B1 and a residence time VD(B2) in the second pyrolysis zone B2 and a ratio of VD(B1) to VD(B2) is represented by Q, wherein the ratio Q of the residence time VD(B1) of the object to be treated and to be recycled in the first pyrolysis zone B1 to the residence time VD(B2) of the object to be treated and to be recycled in the second pyrolysis zone B2 is at least 1.05.

16. The process as claimed in claim 1, wherein the object to be treated and to be recycled has a residence time VD(B1) in the first pyrolysis zone B1 and a residence time VD(B2) in the second pyrolysis zone B2 and a ratio of VD(B1) to VD(B2) is represented by Q, wherein the ratio Q of the residence time VD(B1) of the object to be treated and to be recycled in the first pyrolysis zone B1 to the residence time VD(B2) of the object to be treated and to be recycled in the second pyrolysis zone B2 satisfies the following relationship:

$$[1.05 \leq Q \leq 4].$$

17. The process as claimed in claim 1, wherein the object to be treated and to be recycled has a residence time VD(B1) in the first pyrolysis zone B1 and a residence time VD(B2) in the second pyrolysis zone B2 and a ratio of VD(B1) to VD(B2) is represented by Q, wherein the ratio Q of the residence time VD(B1) of the object to be treated and to be recycled in the first pyrolysis zone B1 to the residence time VD(B2) of the object to be treated and to be recycled in the second pyrolysis zone B2 satisfies the following relationship:

$$[1.1 \leq Q \leq 3.5].$$

18. The process as claimed in claim 1, wherein the object to be treated and to be recycled has a residence time VD(B1) in the first pyrolysis zone B1 and a residence time VD(B2) in the second pyrolysis zone B2 and a ratio of VD(B1) to VD(B2) is represented by Q, wherein the ratio Q of the residence time VD(B1) of the object to be treated and to be recycled in the first pyrolysis zone B1 to the residence time VD(B2) of the object to be treated and to be recycled in the second pyrolysis zone B2 satisfies the following relationship:

$$[1.2 \leq Q \leq 3].$$

19. A process for producing recovered carbon fibers RF from carbon fiber-containing plastics, wherein the process comprises: an object to be treated and to be recycled based on a carbon fiber-containing plastic which comprises carbon fibers in a polymer matrix is subjected to a multistage pyrolysis in the presence of oxygen, with the polymer of the polymer matrix being decomposed during the multistage pyrolysis to form decomposition products originating from the decomposition of the polymer matrix and introduction of oxygen, and to take off the decomposition products from the carbon fibers to give the recovered carbon fibers RF;

wherein the multistage pyrolysis is carried out by passing the object to be treated and to be recycled through a pyrolysis apparatus P, wherein the pyrolysis apparatus P comprises at least the following treatment zones in the order specified below and the object to be treated and recycled goes through the following treatment zones in this order:

(A) a heating-up zone A in which the object to be treated and to be recycled is heated to a defined temperature T(A), (B1) subsequent to the heating up zone A, a first pyrolysis zone B1 in which a pyrolysis of some of the polymer of the polymer matrix of the object to be treated and to be recycled occurs and is carried out at a defined temperature T(B1) and a defined oxygen content G(B1), (B2) subsequent to the first pyrolysis zone B1, a second pyrolysis zone B2 in which a final pyrolysis of the polymer of the polymer matrix of the object to be treated and to be recycled still present after the first pyrolysis zone B1, the final pyrolysis is carried out at a defined temperature T(B2) and a defined oxygen content G(B2) to at least essentially complete removal of the polymer of the polymer matrix of the object to be treated and to be recycled, forming the recovered carbon fibers RF, (C) subsequent to the second pyrolysis zone B2, a cooling zone C for cooling the recovered carbon fibers RF obtained from the second pyrolysis zone B2;

wherein the defined oxygen content G(B2) in the second pyrolysis zone B2 is increased compared to the defined oxygen content G(B1) in the first pyrolysis zone B1 and wherein the defined temperature T(B2) in the second pyrolysis zone B2 is increased compared to the defined temperature T(B1) in the first pyrolysis zone B1, wherein the defined oxygen content G(B1) in the first pyrolysis zone B1 is set in the range from 0.1% by volume to 12% by volume and the defined oxygen content G(B2) in the second pyrolysis zone B2 is set in the range from 5% by volume to 17% by volume, however, with the proviso that the defined oxygen content G(B2) in the second pyrolysis zone B2 is increased by at least 3% compared to the defined oxygen content G(B1) in the first pyrolysis zone B1, and wherein the defined temperature T(B2) in the second pyrolysis zone B2 is increased by from 25° C. to 300° C. compared to the defined temperature T(B1) in the first pyrolysis zone B1, wherein the object to be treated and to be recycled has a residence time VD(B1) in the first pyrolysis zone B1 and a residence time VD(B2) in the second pyrolysis zone B2, wherein the residence time VD(B1) of the object to be treated and to be recycled in the first pyrolysis zone B1 is in the range from 0.1 to 60 minutes, and wherein the residence time VD(B2) of the object to be treated and to be recycled in the second pyrolysis zone B2 is in the range from 0.01 to 30 minutes.

20. A process for producing recovered carbon fibers RF from carbon fiber-containing plastics, wherein the process comprises: an object to be treated and to be recycled based on a carbon fiber-containing plastic which comprises carbon fibers in a polymer matrix is subjected to a multistage pyrolysis in the presence of oxygen, with the polymer of the polymer matrix being decomposed during the multistage pyrolysis to form decomposition products originating from the decomposition of the polymer matrix and introduction of oxygen, and to take off the decomposition products from the carbon fibers to give the recovered carbon fibers RF;

wherein the multistage pyrolysis is carried out by passing the object to be treated and to be recycled through a pyrolysis apparatus P, wherein the pyrolysis apparatus P comprises at least the following treatment zones in the order specified below and the object to be treated and recycled goes through the following treatment zones in this order:

(A) a heating-up zone A in which the object to be treated and to be recycled is heated to a defined temperature T(A), (B1) subsequent to the heating-up zone A, a first pyrolysis zone B1 in which a pyrolysis of some of the polymer of the polymer matrix of the object to be treated and to be recycled occurs and is carried out at a defined temperature T(B1) and a defined oxygen content G(B1), (B2) subsequent to the first pyrolysis zone B1, a second pyrolysis zone B2 in which a final pyrolysis of the polymer of the polymer matrix of the object to be treated and to be recycled still present after the first pyrolysis zone B1, the final pyrolysis is carried out at a defined temperature T(B2) and a defined oxygen content G(B2) to at least essentially complete removal of the polymer of the polymer matrix of the object to be treated and to be recycled, forming the recovered carbon fibers RF, (C) subsequent to the second pyrolysis zone (B2), a cooling zone C for cooling the recovered carbon fibers RF obtained from the second pyrolysis zone B2;

wherein the defined oxygen content G(B2) in the second pyrolysis zone B2 is increased compared to the defined oxygen content G(B1) in the first pyrolysis zone B1 and wherein the defined temperature T(B2) in the second pyrolysis zone B2 is increased compared to the defined temperature T(B1) in the first pyrolysis zone B1, wherein the defined oxygen content G(B1) in the first pyrolysis zone B1 is set in the range from 0.1% by volume to 12% by volume and the defined oxygen content G(B2) in the second pyrolysis zone B2 is set in the range from 5% by volume to 17% by volume, however, with the proviso that the defined oxygen content G(B2) in the second pyrolysis zone B2 is increased by at least 3% by volume compared to the defined oxygen content G(B1) in the first pyrolysis zone B1, and wherein the defined temperature T(B2) in the second pyrolysis zone B2 is increased by from 25° C. to 300° C. compared to the defined temperature T(B1) in the first pyrolysis zone B1, wherein the object to be treated and to be recycled has a residence time VD(B1) in the first pyrolysis zone B1 and a residence time VD(B2) in the second pyrolysis zone B2 and a ratio of VD(B1) to VD(B2) is represented by Q, wherein a ratio Q of the residence time VD(B1) of the object to be treated and to be recycled in the first pyrolysis zone B1 to the residence time VD(B2) of the object to be treated and to be recycled in the second pyrolysis zone B2 satisfies the following relationship:

$$[1.05 \leq Q \leq 4].$$

* * * * *